United States Patent [19]
Nakajima

[11] Patent Number: 6,128,018
[45] Date of Patent: Oct. 3, 2000

[54] SIMULATION APPARATUS AND INFORMATION STORAGE MEDIUM

[75] Inventor: Nobutaka Nakajima, Yokohama, Japan

[73] Assignee: Namco, Ltd., Tokyo, Japan

[21] Appl. No.: 08/930,914

[22] PCT Filed: Feb. 19, 1997

[86] PCT No.: PCT/JP97/00442

§ 371 Date: Oct. 14, 1997

§ 102(e) Date: Oct. 14, 1997

[30] Foreign Application Priority Data

Feb. 20, 1996 [JP] Japan ................................ 8-56997

[51] Int. Cl.$^7$ .................................................. G06T 15/00
[52] U.S. Cl. .......................................... 345/419; 345/420
[58] Field of Search .................................. 345/427, 420, 345/421, 433, 437, 474, 434, 419

[56] References Cited

U.S. PATENT DOCUMENTS

| | | | |
|---|---|---|---|
| 5,123,084 | 6/1992 | Prevost et al. | 345/420 |
| 5,191,642 | 3/1993 | Quick et al. | 345/427 |
| 5,252,068 | 10/1993 | Gryder . | |
| 5,425,139 | 6/1995 | Williams et al. | 345/474 |
| 5,548,694 | 8/1996 | Gibson . | |
| 5,577,175 | 11/1996 | Naka et al. | 345/427 |
| 5,687,307 | 11/1997 | Akisada et al. | 345/437 |

FOREIGN PATENT DOCUMENTS

| | | |
|---|---|---|
| 7-093578 | 4/1995 | Japan . |
| 7-105409 | 4/1995 | Japan . |
| 7-152807 | 6/1995 | Japan . |
| 7-168952 | 7/1995 | Japan . |
| 7-230559 | 8/1995 | Japan . |
| 8-276070 | 10/1996 | Japan . |
| 8-315181 | 11/1996 | Japan . |
| 9-81776 | 3/1997 | Japan . |

OTHER PUBLICATIONS

Foley et al., "Computer Graphic: Principles and Practice" second edition, Addison–Wesley publishing company, pp. 117–124, 534, 557–558, 660–663, 1993.

*Primary Examiner*—Mark K. Zimmerman
*Assistant Examiner*—Cliff N. Vo
*Attorney, Agent, or Firm*—Oliff & Berridge, PLC

[57] ABSTRACT

A simulation apparatus and an information storage medium are described which can perform collision decision for a moving object with respect to another displayed object with a reduced the amount of data and the computation load. There are included a decision region defining section (114) which defines a decision region which specifies a three-dimensional space for collision decision based on the entire shape of a target object to be collided or of a portion thereof, and a collision decision section (118) which decides whether a collision has occurred or not, based on whether or non the position of the moving object is located within the decision region. When the decision region defining section (114) defines a negative hit region which specifies a noncollision region as the decision region, and the collision decision section (118) decides that no collision has occurred if the position of the moving object is located within the negative hit region. Further, when the decision region defining section (114) defines a combination of the negative hit region and a positive hit region which specifies a collision region as the decision region, with these hit regions at least partly overlapping one another, then the collision decision section (118) decides whether a collision has occurred or not based on given rules if the position of the moving object is located within the overlapping region.

27 Claims, 17 Drawing Sheets

FIG.4

| OBJECT NUMBER | POSITIONAL INFORMATION | | | DIRECTIONAL INFORMATION | | | SUBJECT OF DECISION FLAG |
|---|---|---|---|---|---|---|---|
| $OB_0$ | $X_0$ | $Y_0$ | $Z_0$ | $\theta_0$ | $\phi_0$ | $\rho_0$ | $hf_0$ |
| $OB_1$ | $X_1$ | $Y_1$ | $Z_1$ | $\theta_1$ | $\phi_1$ | $\rho_1$ | $hf_1$ |
| $OB_2$ | $X_2$ | $Y_2$ | $Z_2$ | $\theta_2$ | $\phi_2$ | $\rho_2$ | $hf_2$ |
| $OB_3$ | $X_3$ | $Y_3$ | $Z_3$ | $\theta_3$ | $\phi_3$ | $\rho_3$ | $hf_3$ |
| $OB_4$ | $X_4$ | $Y_4$ | $Z_4$ | $\theta_4$ | $\phi_4$ | $\rho_4$ | $hf_4$ |
| ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ |
| $OB_{i-2}$ | $X_{i-2}$ | $Y_{i-2}$ | $Z_{i-2}$ | $\theta_{i-2}$ | $\phi_{i-2}$ | $\rho_{i-2}$ | $hf_{i-2}$ |
| $OB_{i-1}$ | $X_{i-1}$ | $Y_{i-1}$ | $Z_{i-1}$ | $\theta_{i-1}$ | $\phi_{i-1}$ | $\rho_{i-1}$ | $hf_{i-1}$ |
| $OB_i$ | $X_i$ | $Y_i$ | $Z_i$ | $\theta_i$ | $\phi_i$ | $\rho_i$ | $hf_i$ |

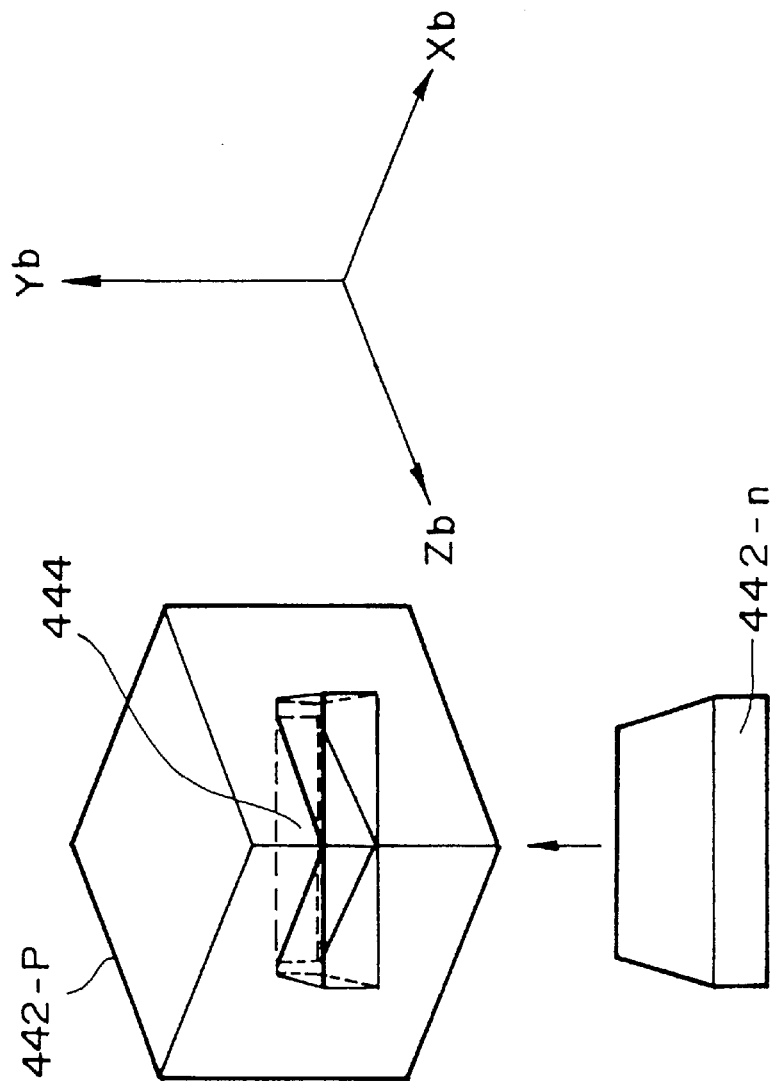
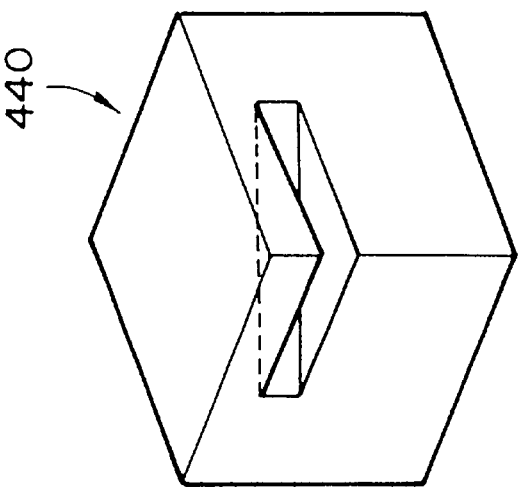

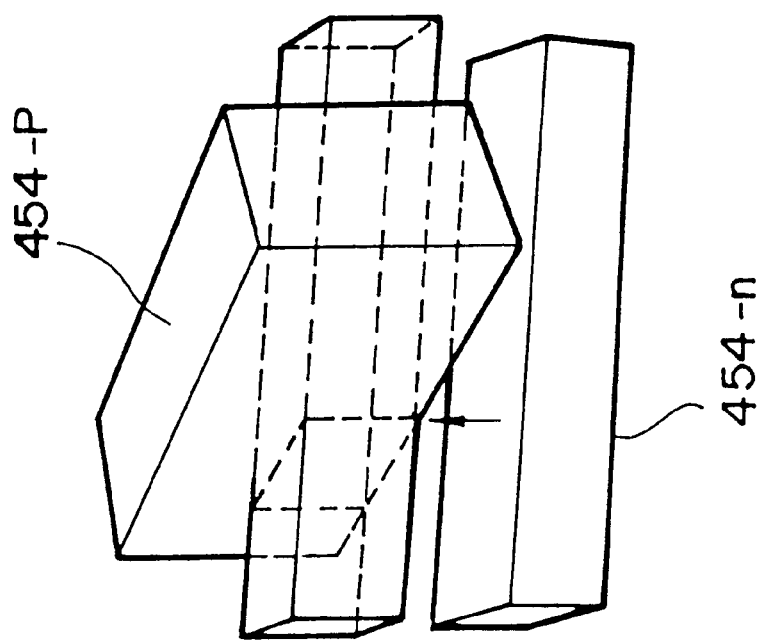
FIG. 14C
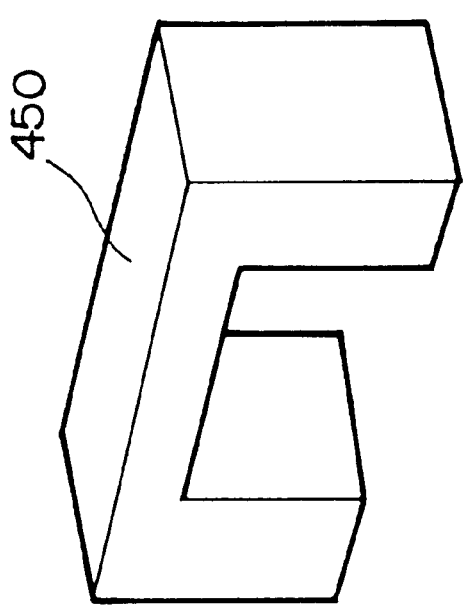
FIG. 14A
FIG. 14B

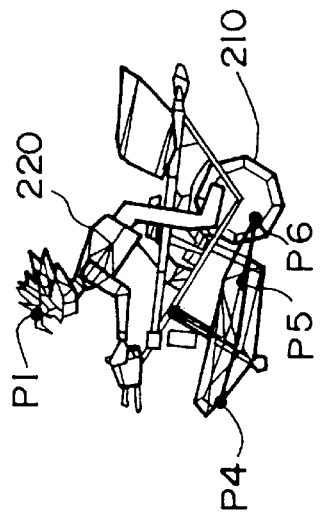
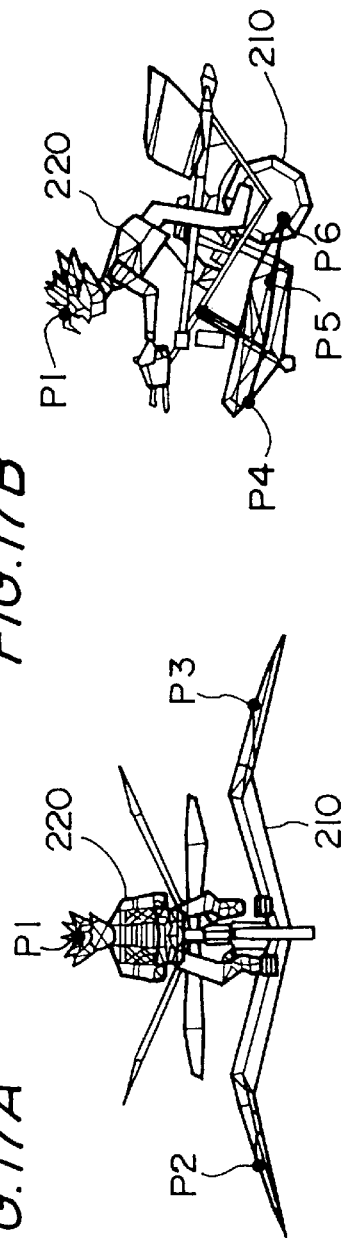
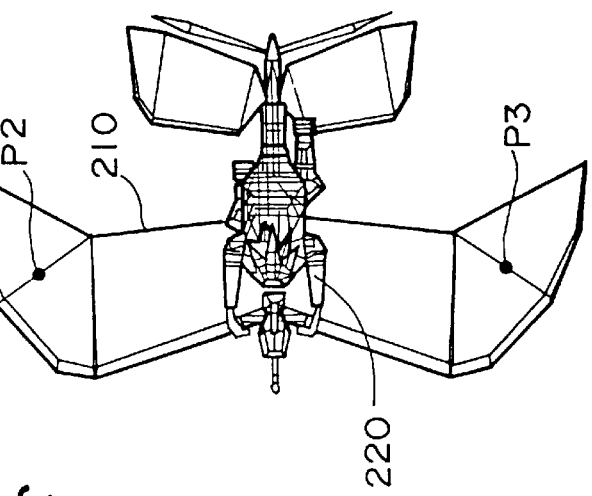

SIMULATION APPARATUS AND INFORMATION STORAGE MEDIUM

TECHNICAL FIELD

The present invention relates to a simulation apparatus and to an information storage medium, and particularly relates to a simulation apparatus and to an information storage medium which perform collision decision between moving objects and other objects.

BACKGROUND ART

From the prior art, game machines are per se known with which a player operates a player moving body or the like within a virtual three-dimensional game space while looking at a game image which is displayed on a display. With this sort of game machine it is necessary to detect collisions with obstacles in order properly to perform game representation when the player moving body has collided with an obstacle such as another moving body or a building or wall. With this type of game accurate collision decision is necessary, since the manner in which this collision decision with respect to obstacles is performed is an important factor which dominates the interest of the game.

This type of collision decision is easy with driving games and the like in which the player moving body moves two-dimensionally. This is because with driving games and the like, the subjects for decision are extremely limited, since cases in which the height dimension is relevant for collision decision are uncommon, and normally it is sufficient to perform collision decision two-dimensionally with respect to obstacles which are present on both sides of the course and with other racing cars which are proceeding ahead, behind, on the left, and on the right.

However, when the player moving body is a moving object which flies freely in three-dimensional space such as an aircraft, the track of its motion can be set almost without limitation. In order to perform accurate collision decision in these sorts of circumstances, forward, backward, leftward, rightward, upward and downward three-dimensional collision decision is necessary between the player moving body and a large number of obstacles which are present in three-dimensional space. Due to this, the computation load on the CPU increases rapidly. The same problem arises as well with regard to shooting games in which three-dimensional hit checking is required.

When this kind of hit checking or collision decision is to be performed, such a performance of collision decision with respect to the obstacles itself in the virtual three-dimensional space, causes extreme increase in the amount of data and in the computation load. Thus, decision regions are defined whose form approximates to each obstacle, and decisions are made as to the presence or absence of collisions according to whether the position of the moving body is inside or outside the decision regions. By setting the decision regions so that they may be specified using as little data as possible and so that the computation load for the decisions is as light as possible, it is intended to reduce the amount of data and reduce the computation load for performing collision decision.

Decision regions (the term "hit box" will be used hereinafter) shaped as rectangular parallelepipeds have normally been used as these decision regions. This is because a rectangular parallelepiped has the advantages of being able to be specified with a small amount of data and of only requiring a light computation load for decision. When collision decision is being performed using a hit box, it is determined that a hit or collision has occurred when the position of a moving body or a bullet or the like comes to be inside this hit box.

For example, as shown in FIG. 7, when deciding whether or not a moving body has collided with a house 310, a hit box 300 is defined which approximates in form to the house 310. It is determined that a collision has occurred when the position of the moving body is inside this hit box 300.

However, when the decision region for an object which has a complicated shape is to be approximated by rectangular parallelepipeds, it is necessary to define the decision region as a combination of rectangular parallelepipeds in order to perform accurate collision decision. Accordingly there has been the problem that a large number of hit boxes has become necessary when defining the decision region, and this provokes increase in the computation load.

Further, generally, when defining the decision region for an object which is an obstacle, the more the object is of a simple rectilinear shape, the easier it becomes to define the decision region. However, with the method of making a decision as to whether a hit or collision has occurred by whether the moving body has come to be inside the hit box, it can also happen that the amount of data and the computation load increases, even with simple rectilinear shapes as shown for example in FIG. 13A.

DISCLOSURE OF THE INVENTION

The present invention has been made in consideration of this type of problem, and provides a simulation apparatus and an information storage medium which are capable of performing collision decision with a reduced amount of data and computation load when performing collision decision between a moving object and other objects.

The simulation apparatus of the present invention performs collision computations for a moving object which moves in a virtual three-dimensional space with respect to a target object which is present in the virtual three-dimensional space and is a subject of collision, the simulation apparatus comprising:

a decision region defining means for defining a decision region which specifies a three dimensional space for collision decision based on at least the entire shape of the target object and a portion thereof; and a collision decision means for deciding whether a collision has occurred or not, based on whether or not the position of the moving object is located within the decision region;

wherein the decision region defining means defines a negative hit region which specifies a noncollision region for the decision region; and the collision decision means decides that no collision has occurred when the position of the moving object is located within the negative hit region.

In this context, a moving object is meant a moving thing for example such as an aircraft or a bullet, and a target object is meant an object with which there is a possibility that such a moving object can collide, for example a moving object such as another aircraft and a fixed object such as a building or a natural formation.

Further, a decision region is a region which is defined for reducing the amount of data and lightening the computation load when making a decision as to whether or not the moving object has collided with the target object. When collision decision is performed with respect to such a target object, the amount of data and the computation load are extremely increased. Therefore, the collision decision is performed by defining such a decision region which approximates to the shape of the target object.

This type of decision region can either be made up from one solid form or as a combination of solid forms. Whatever be the shapes of the various solid forms, it is preferable for them to have the advantage of being specified by a small amount of data and reducing the computation load for making decisions. For these reasons it is desirable to define the decision region as one solid form or as a combination of solid forms which can be specified with a small amount of data, such as rectangular parallelepipeds, or spheres or right cylinders.

Normally the decision region is defined as a positive decision region (hereinafter termed a positive hit region) in which it is deemed that a collision has occurred if the position of the moving object is located within this decision region. However, for example, if the target object has a doughnut shape with a central hole through it, and if the noncollision region is surrounded by the collision region (for example, in a tunnel or a cave or the like), there are cases in which the number of solid forms required for specification of the decision region becomes large, so that the amount of data and the computation load are increased. Further, it can also happen that it is very difficult to define the decision region using only positive hit regions.

Accordingly, with the present invention, a negative hit region is defined which constitutes a negative decision region to make a decision that no collision has occurred when the moving object is positioned within this negative hit region.

By doing this, it becomes possible to reduce the number of solid forms which make up the decision region, and it is possible to reduce the amount of data and the computation load for collision decision. It should be noted that, for the particular decision of collision decision with respect to the interior walls such as inside a tunnel or cave, there are also cases in which it is possible to decide whether or not collision has occurred by only detecting whether or not the moving object is located within a negative hit region. However, the present invention is not limited to the case of simply making a decision that collision has occurred if the moving object is not located within the negative hit region.

As an aspect of the present invention, the decision region defining means may define, as the decision region, a combination of a negative hit region which specifies a noncollision region and a positive hit region which specifies a collision region, the hit regions at least partly overlapping one another; and wherein the collision decision means decides that no collision has occurred when the position of the moving object is located only within the negative hit region, decides that a collision has occurred when the position of the moving object is located only within the positive hit region, and decides whether a collision has occurred or not based on given rules when the position of the moving object is located within the region of overlap between the negative hit region and the positive hit region.

When collision decision is performed in this manner using a combination of a negative hit region and a positive hit region, if these two regions do not overlap, the decision is performed based on the region in which the moving object is located.

When the two hit regions do overlap, the collision decision is performed by treating the negative hit region as a decision region of higher priority than the positive hit region. However, according to the manner in which these two regions overlap it may also be appropriate for the decision to be made while giving priority to the positive hit region.

When the decision region is defined in this manner as a combination of a positive hit region and a negative hit region, it is possible to reduce the number of solid forms which are used to form the decision region, and to reduce the amount of data and the computation load accompanying the collision decision.

According to another aspect of the present invention, the decision region defining means may define the decision region as a combination of solid forms.

By doing this, it is possible to form a decision region of a complicated shape by combining a number of solid forms whose individual shapes are simple. Accordingly, it is possible to reduce the amount of data and the computation load accompanying collision decision.

According to another aspect of the present invention, the decision region defining means may define the decision region as one rectangular parallelepiped or as a combination of rectangular parallelepipeds.

The rectangular parallelepiped, which has the advantage that can be specified with a small amount of data, and reduce the computation load for decision, is the most desirable solid form for forming the decision region. Although the spherical shape or the like also in the same way has the advantage of being able to be specified using a small amount of data, the computations for decision in the case of a rectangular parallelepiped can be performed only using addition and subtraction, and therefore in this case it can reduce the computation load for performing collision decision.

According to another aspect of the present invention, the decision region defining means may define the decision region by combining solid forms which form the same type of hit region, that is at least one of a negative hit region and a positive hit region, so that at least one portion thereof overlaps.

Solid forms which form the same type of hit regions imply solid forms which either form only negative hit regions or positive hit regions. By defining the decision region so that solid forms, which form the same type of hit region, overlap, it is possible to define a decision region of a complicated shape as a combination of a reduced number of solid forms, and to reduce the computation load for performing collision decision and the amount of data.

According to another aspect of the present invention, the decision region defining means may define the decision region by setting a basic state that is a position in which three sides of a rectangular parallelepiped forming the decision region, which are not mutually parallel each other, respectively parallel to any one of coordinate axes in the world coordinate system of the virtual three-dimensional space, or by rotating the rectangular parallelepiped from the basic state around one or two of the coordinate axes of the world coordinate system.

According to another aspect of the present invention, the decision region defining means may define the decision region by setting a basic state that is a position in which three sides of a rectangular parallelepiped forming the decision region, which are not mutually parallel each other, respectively parallel to any one of coordinate axes in a body coordinate system of the target object in the virtual three-dimensional space, or by rotating the rectangular parallelepiped from the basic state around one or two of the coordinate axes of the body coordinate system.

When collision decision is performed, if a rectangular parallelepiped forming the decision region is set as the basic state, it becomes possible to perform the computations for collision decision only by addition and subtraction, and accordingly it is possible to reduce the computation load which accompanies collision decision. However, depending on the shape of the target object, there are cases in which it is difficult to define the decision region using only rectangular parallelepipeds in such a basic state. In such cases, it is possible to reduce the computation load which accompanies collision decision by defining the decision region as described above, according to one of the above aspect of the present invention.

That is to say, when collision decision is performed using coordinate values in the world coordinate system, then, the decision region is defined by rotating a rectangular parallelepiped with respect to the basic state around one or two of the coordinate axes of the world coordinate system, it is possible to perform collision decision by performing coordinate transformation corresponding to the rotation, by additionally performing the addition or subtraction computation.

On the other hand, when collision decision is performed using coordinate values in the body coordinate system, then the decision region is defined by rotating a rectangular parallelepiped with respect to the basic state around one or two of the coordinate axes of the body coordinate system, it is possible to perform collision decision by performing coordinate transformation corresponding to the rotation, by additionally performing the addition or subtraction computation.

In either of these cases it is possible to reduce the computation load which accompanies collision decision, since it is sufficient merely to supplement that transformation of coordinates which corresponds to a rotation.

According to another aspect of the present invention, the decision region defining means may define the decision region by combining rectangular parallelepipeds, so that, by any way of combination, one of three sides of one rectangular parallelepipeds which are not parallel to each other is not parallel to any one of three side of another rectangular parallelepipeds which are not parallel to each other.

By doing this, it becomes possible to define decision regions of a great diversity of shapes, even if the solid forms which are being combined are the same. For example, by rotating and combining rectangular parallelepipeds, it is possible to define the shape of the overlapped portion as a triangular prism or the like.

Further, the decision region defining means in the present invention may comprise a decision region storage means in which information for these decision regions is stored in advance.

By doing this, the computations for defining the decision regions at the time of collision computation is no longer necessary, since decision regions which have been defined in advance can be used for performing the decision computations. Accordingly it is possible to reduce the computation load and to shorten the processing time.

According to another aspect of the present invention, the simulation apparatus may further comprise:

an input means for inputting at least one of a movement position of the moving object which is used for deciding whether a collision has occurred or not by the collision decision means, and movement conditions for determining the movement position; and an image synthesizing means for synthesizing a simulation image for the virtual three-dimensional space to be displayed on a display section based on the results of decision by the collision decision means.

Here, the expression "inputting at least one of a movement position, and movement conditions for determining the movement position" is intended to include the case, for example, of which an operator-uses the input means to operate a ridable object when the moving object is an object which can be ridden on such as an aircraft, as well as the case of firing a bullet in a shooting game or the like.

By doing this, it is possible to reduce the amount of data and the computation load for collision computation for the moving object that is determined by input movement position or movement conditions, and it is possible to display a simulation image which reflects the results of collision.

BRIEF DESCRIPTION OF THE DRAWINGS

FIG. 4 is a figure showing information which is stored in a space information storage section of the game machine of this embodiment.

FIGS. 13A and 13B are figures showing yet another exemplary definition of a decision region.

FIGS. 14A, 14B, and 14C are figures showing yet another exemplary definition of a decision region.

FIGS. 17A, 17B, and 17C are polygonal figures defined by predetermined points of the virtual player riding on the human-powered aircraft of this embodiment.

BEST MODE FOR CARRYING OUT THE INVENTION

The preferred embodiment of the present invention will be explained by taking as an example a game machine with which the player rides on a human-powered aircraft and flies freely within a three-dimensional game space.

Figure 1:
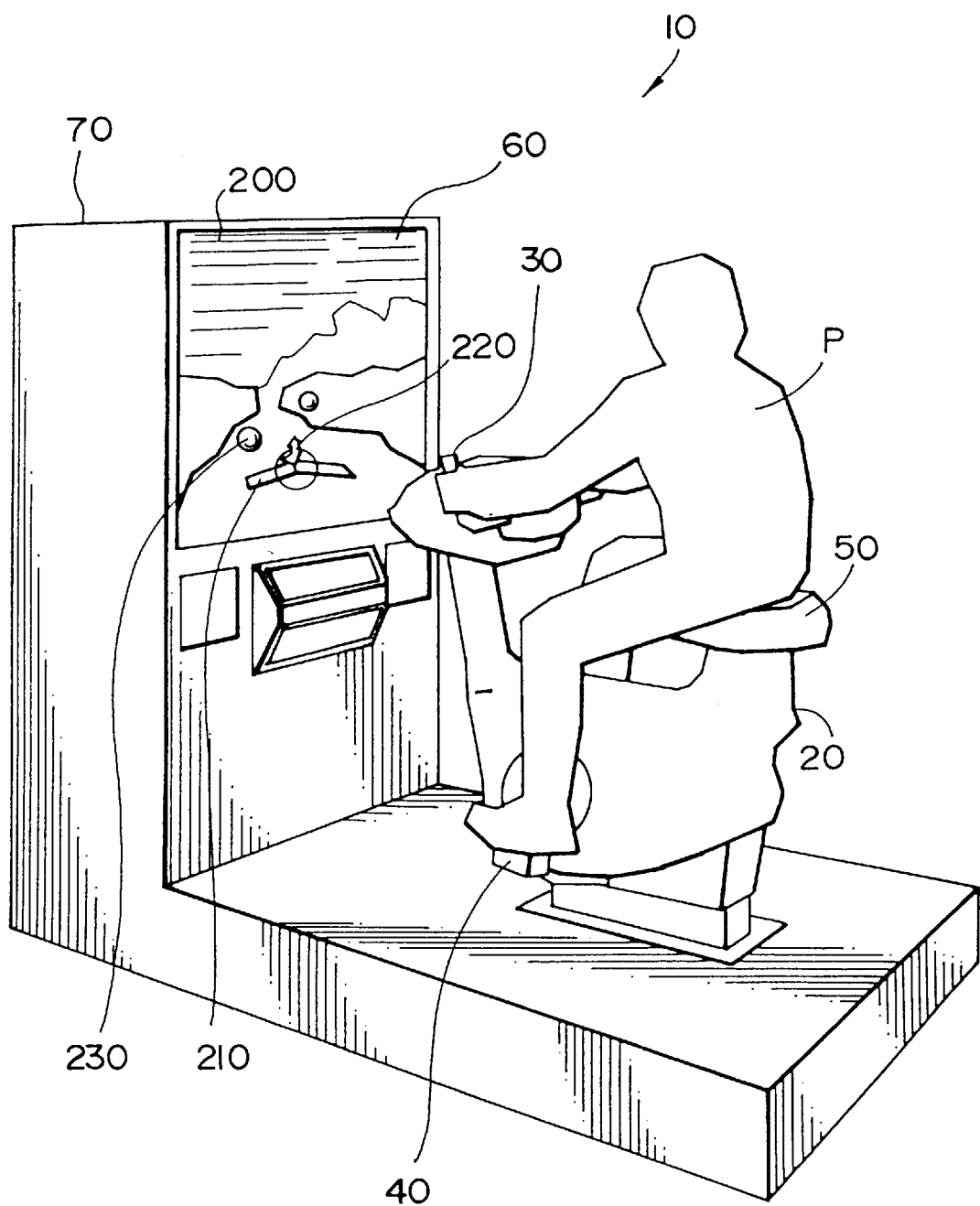
FIG. 1 is a perspective figure showing the overall construction of an exemplary game machine according to a principal embodiment of the present invention.

The exterior appearance of the preferred embodiment of the game machine is shown in FIG. 1. In this preferred embodiment of the game machine, an operation section 20 and a display 60 are arranged on a housing 70 which is formed as substantially L-shaped.

This operation section 20 is formed so as to look like the driving seat of a human-powered aircraft. It is constructed so that a player P may sit in a saddle 50 and may operate the human-powered aircraft by operating handlebars 30 with both hands, and while pedaling on pedals 40 so as to input driving force for the human-powered aircraft.

The display 60 is arranged so as to be positioned directly in front of the player P sitting in the saddle 50. A game image 200 in which the human-powered aircraft flies within a three-dimensional game space is displayed on the display 60.

Figure 6:
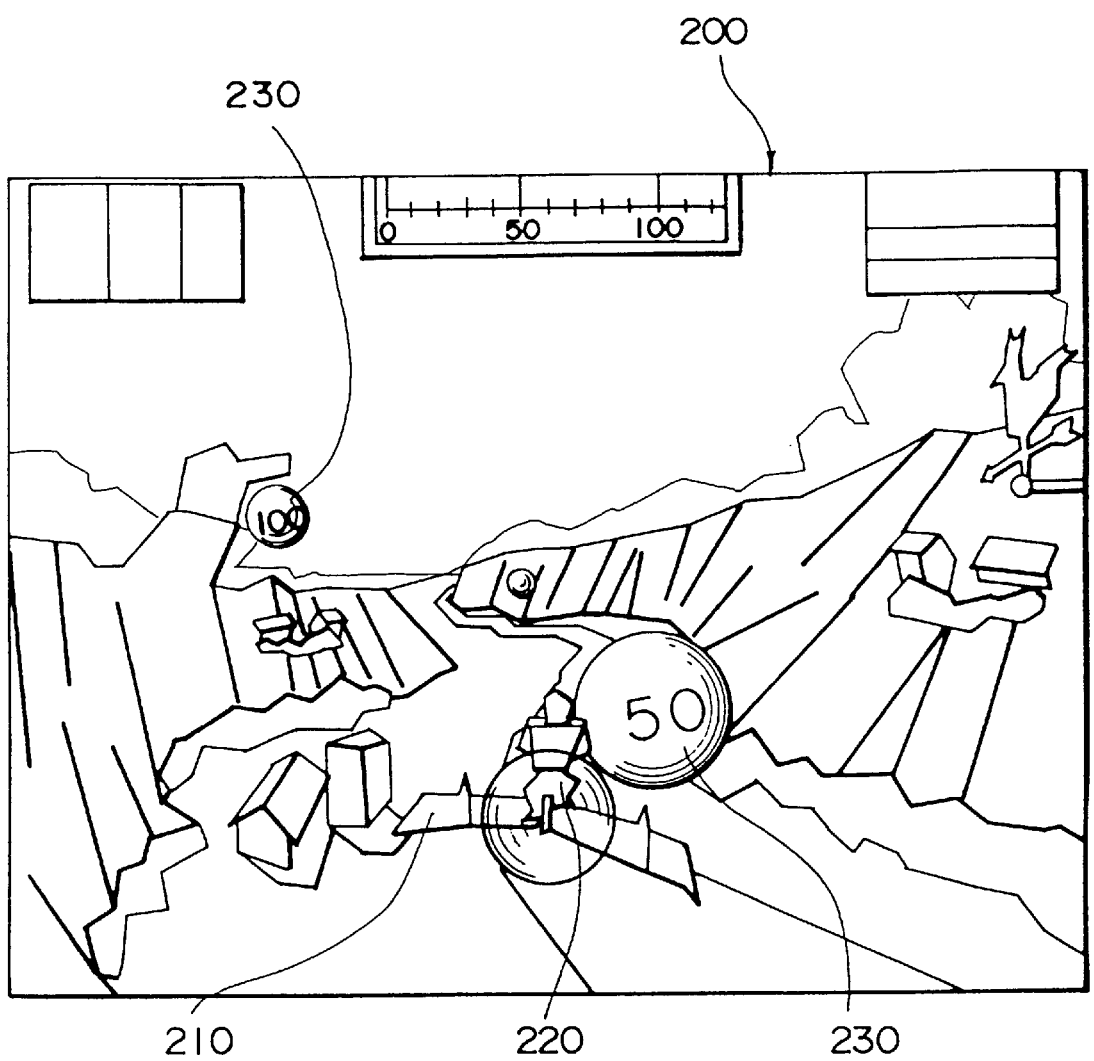
FIG. 6 is a figure showing an screen display image of the game machine of this embodiment.

An example of a game image 200 shown on the display 60 of this game machine 10 is shown in FIG. 6. By the player P operating the operation section 20, a virtual player 22 who is riding on a human-powered aircraft 210 in the game image is flown through a virtual three-dimensional space of a game stage which is also displayed on the game image. Objects like balloons called "point balloons" 230 are disposed within this space, and when the human-powered aircraft 210 which is being ridden by the virtual player comes into contact with any one of these point balloons 230 the player P receives the number of points borne by that point balloon 230. The player P aims at a goal while acquiring points in this manner. However, it is a condition for him to clear this game stage that within a certain limited time period he should arrive at the goal while acquiring a given number of points. The construction is such that, when he has cleared this game stage, he is able to progress to a new and relatively more difficult game stage.

Complicated formations with the arrangement of buildings, mountains, caves and the like are set within the virtual three-dimensional space of each stage, and the virtual player 220 who is riding on the human-powered aircraft 210 must fly along while avoiding these obstacles such as buildings, mountains, and the walls of these caves.

Accordingly, the performance of accurate collision decision with respect to these obstacles is an important prerequisite for the realistic rendition of a game. However, it is necessary to take accurate account of the shapes of these obstacles such as buildings and natural formations in order to perform accurate collision decision with respect to them, and the amount of data and the computation load are increased, so that computation processing in real time becomes difficult.

In this connection, in order to reduce the amount of data required for collision decision and to mitigate the computation load, this game machine 10 employs a construction in which the decision region is defined for collision decision by approximating the shape of an obstacle as a rectangular parallelepiped or as a combination of rectangular parallelepipeds, which can be specified with less data, and is possible to manage with a lesser computation load for making decisions.

Figure 2:
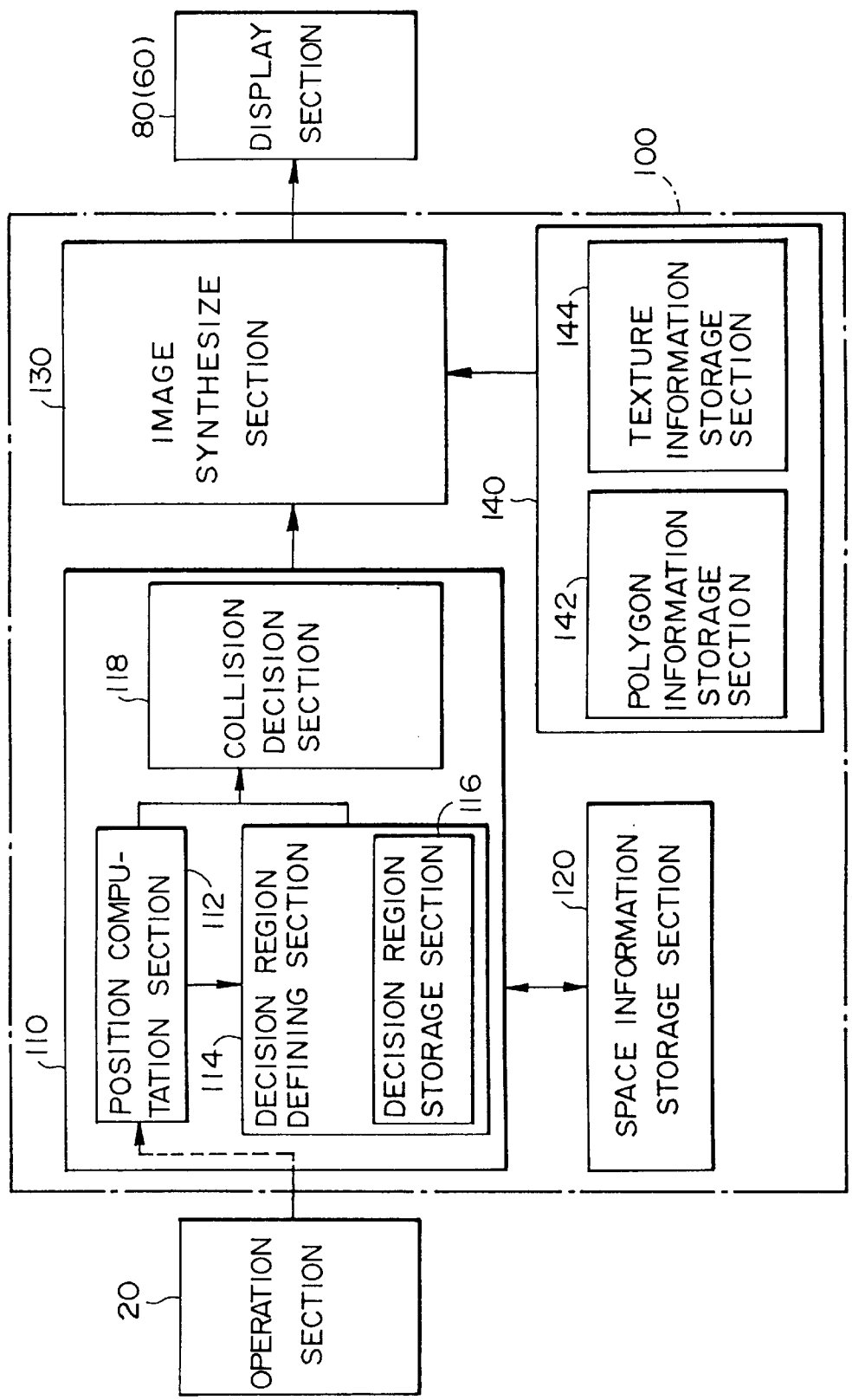
FIG. 2 is a functional block diagram showing the construction of the game machine of this embodiment.

In FIG. 2 there is shown a functional block diagram of m this game machine 10.

The arcade video game machine of the embodiment comprises the operation section 20, a game space computation section 100, and a display section 80. The operation section 20 comprises members such as the handlebars 30 and the pedals 40 that are operated by the player. The game space computation section 100 comprises a space computation section 110, a space information storage section 120, an image synthesize section 130, and an object image information storage section 140. The display section 80 is constituted by the display 60.

The space information storage section 120 stores positional information and directional information of the various display objects (moving objects such as the virtual player 210 who is riding on the human-powered aircraft 210 and the point balloons 230, and fixed objects such as tunnels, walls, buildings, standing trees, caves and mountains) which are arranged on the game stage, and flags hf for subject of decision which will be described hereinafter.

Figure 3:
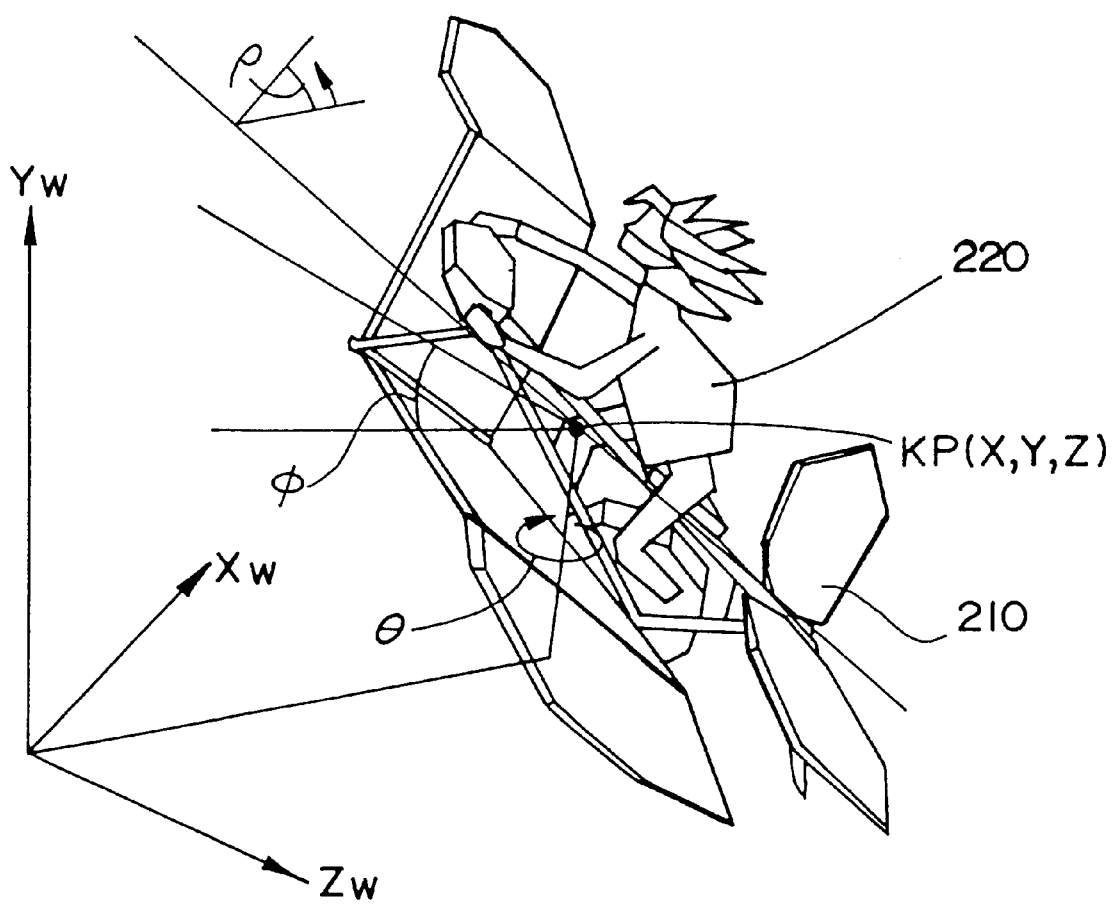
FIG. 3 is a figure showing the relationship between the position and orientation of a virtual human-powered aircraft and positional information and directional information.

FIG. 3 is a figure showing the relationship between the position and orientation of the virtual player 220 who is riding on the human-powered aircraft 210 which is a moving object (and which combination will henceforward simply be termed the human-powered aircraft 210), and positional information (X, Y, Z) and directional information ($\theta$, $\phi$, $\rho$). As shown in this figure, with this game machine, the game stage is set up by storing positional information (X, Y, Z) and directional information ($\theta$, $\phi$, $\rho$) for a reference point KP on each displayed object as position coordinates and angular values in a world coordinate system (Xw, Yw, Zw) which is provided for the virtual game stage (object space).

As shown in FIG. 4, the positional information (X, Y, Z) and directional Information ($\theta$, $\phi$, $\rho$) for the reference point KP for each displayed object which is thus set is stored in the space information storage section 120. In detail, the positional information (X, Y, Z) and directional information ($\theta$, $\phi$, $\rho$) for the reference points KP of (i+1) objects are stored in the space information storage section 120, along with object numbers OB which are allocated to the various displayed objects. Here, in particular, the object number OB0 is allocated to the object which constitutes the main body of the human-powered aircraft 210, while the object numbers OB1, OB2, OB3, . . . are allocated to other objects such as tunnels, walls, buildings, standing trees, caves, mountains, and the like.

In each subject of decision flag hf includes a flag which shows whether or not the displayed object is an object (a subject of decision obstacle which will be described later) for which collision decision should be performed by setting a decision region being defined by a decision region defining section 114.

The space computation section 110 is constructed to utilize a CPU, memory, and so on, and performs, based on control signals from the operation section 20 and on a given game program, computations to fly the human-powered aircraft 210 through the virtual three-dimensional space and to get the point balloons 230, and outputs the results of these computations to the image synthesize section 130.

Further, a position computation section 112 of this space computation section 110 overwrites and updates the positional information (X, Y, Z) and the directional information ($\theta$, $\phi$, $\rho$) for the human-powered aircraft 210 on the game stage which is stored in the manner described above, each time a given time period has elapsed, for example each 1/60 of a second, according to the control signals which are input from the operation section 20 and the game program and so on. For example, the fact that the human-powered aircraft 210 moves in the direction of the x-axis of the world coordinate system on the game stage without changing its orientation is expressed by the position computation section 112 of the space computation section 110 changing the x-coordinate of the positional information which is stored along with the corresponding object number which is stored in the space information storage section 120 by a given increase amount according to the speed of movement and again storing it. By doing this, it is possible easily to render the circumstance that the human-powered aircraft 210 changes its position and direction (orientation) moment by moment on the game stage.

Now, in order to display on the game screen the fact that the human-powered aircraft 210 is changing its position and its direction on the game stage moment by moment in this manner, viewpoint information such as the viewpoint position which is the position as seen from which the image is to be displayed, the viewing line direction, the visual field angle, and so on is necessary.

In this embodiment, the construction allows either a first person viewpoint display to be selected in which an image is shown from the viewpoint of the virtual player 220 who is riding on the human-powered aircraft 210, or a third person viewpoint display to be selected in which an image is shown from a viewpoint which is following after the human-powered aircraft 210. This type of viewpoint information is determined based on the positional information (X, Y. Z) and the directional information ($\theta$, $\phi$, $\rho$) computed by the position computation section 112.

Frame information including this type of viewpoint information and the like is also stored in the space information storage section 120. This frame information is also updated by the space computation section 110 each time a given time period has elapsed, based on the positional information (X, Y, Z) and the directional information ($\theta$, $\phi$, $\rho$) for the human-powered aircraft as computed by the position computation section 112. In this manner, an image is displayed on the game screen in real time which displays the virtual three-dimensional space as seen from the moving viewpoint position.

The details of the decision region defining section 14 of the space computation section 110 and of the collision computation which is performed by the collision decision section 118 will be described hereinafter.

Next, the details of the functioning for image creation of the image synthesize section 130 and the object image information storage section 140 will be explained.

This object image information storage section 140 stores information related to the shapes and external appearances of the various displayed objects which appear on the scene of the game stage, and comprises a polygon information storage section 142 and a texture information storage section 144. In detail, in this game machine, each displayed object is modeled by a combination of polygons, and a texture which gives the external appearance of the corresponding displayed object is mapped to each polygon.

In this polygon information storage section 142, as information which defines the shape of each displayed object, the vertex coordinates of each polygon which forms up the displayed object, and information which reads the texture information which is mapped to the corresponding polygon are stored in correspondence. These vertex coordinates are stored in the form of position coordinates of each vertex with respect to a coordinate system which is provided in correspondence with each displayed object (a body coordinate system).

In this texture information storage section 144, texture information for the textures which are mapped to these polygons is stored. Here, texture information means information relating to the colors and the patterns on the surfaces of the displayed objects.

Figure 5:
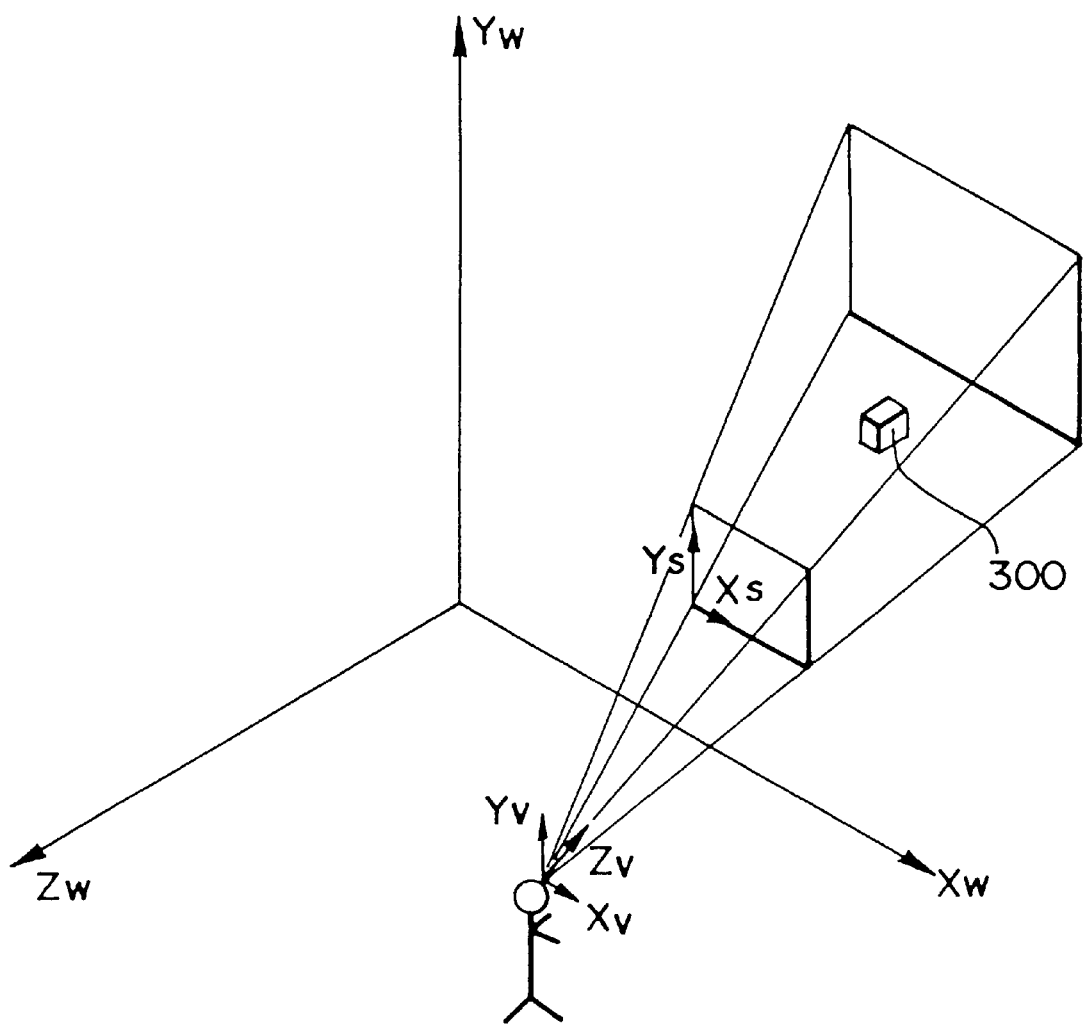
FIG. 5 is a figure for explanation of an image synthesizing procedure for the game machine of this embodiment.

Further, an image which represents a scene on the game stage is created by this image synthesize section 130 according to the information stored in the space information storage section 120 and in the object information storage section 140. More specifically, in the beginning, computations are performed for arranging the polygons which forms a displayed object 300 on the game stage which is expressed by the world coordinate system (Xw, Yw, Zw) as shown in FIG. 5. In detail, the position information for the polygons which forms the displayed object are stored in the polygon information storage section 142 of the object image information storage section 140 as coordinate information in the body coordinate system for that object. The image synthesize section 130 transforms this information into position coordinates in the world coordinate system (Xw, Yw, Zw) by executing three-dimensional coordinate transformations such as parallel movement, rotation, reversion, magnification, shrinkage, based on the positional information (X, Y, Z) and the directional information ($\theta$, $\phi$, $\rho$) stored in the space information storage section 120. Next, for each displayed object, it performs processing to transform the coordinates of the polygons which form the display object into a viewpoint coordinate system (Xv, Yv, Zv), based on the given viewpoint. After this, a procedure for projection transformation into a screen coordinate system (Xs, Ys) is executed by performing a procedure such as a clipping procedure. The display section 80 outputs a display image for a given region of the game space, based on the image information in the screen coordinate system (Xs, Ys) which has been obtained in this manner.

Next the function of performing collision decision will be explained. When collision decision with respect to obstacles in the virtual three-dimensional space is performed, if this collision decision is performed with respect to the obstacles themselves, the amount of data and the computation load extremely increase. For this reason, the technique generally used is to carry out collision decision with respect to decision regions defined to approximate to the shape of the obstacles. It is desirable to define this type of decision region as a solid form or as a combination of solid forms which can be defined with a small amount of data, and moreover for which the computation load for the decision is reduced. For this, with this game machine 10 as well, as described previously, the decision regions are defined as rectangular parallelepipeds or as combinations of rectangular parallelepipeds, and collision decision between the human-powered aircraft and the obstacles is performed.

However in a conventional way, when collision decision has been performed by defining this type of decision region, only positive decision regions (in the following, termed "positive hit boxes"), in which it is deemed that a collision has occurred if a moving object is positioned inside the rectangular parallelepipeds, have been defined for performing collision decision. However, there has been the problem that, in order to define a decision region which approximates to the shape of an obstacle, it often happens that the number of rectangular parallelepipeds needed to form the decision region becomes large, in which case the amount of data and the computation load are increased. Further, depending on the shape of the obstacle, there are also cases in which it is difficult to define the decision region as a combination of even a large number of rectangular parallelepipeds.

Thus with this game machine 10 the construction is such that, when a decision region is defined and collision decision is performed, negative decision regions (in the following termed "negative hit boxes"), in which it is deemed that a collision has not occurred if a moving object is positioned inside the rectangular parallelepipeds, are also defined in order to perform collision decision.

The definition of this type of decision region is done by the decision region defining section 114. The decision region defining section 114 comprises a decision region storage section 116. Such decision region is formed either as a single positive hit box or negative hit box or as a combination of positive and negative hit boxes, so as to approximate to the shape of the relevant obstacle which is to be the subject of decision (hereinafter termed the "subject of decision obstacle"), and information for the decision regions which are formed in this manner is stored in the decision region storage section 116.

More specifically, what is stored (hereinafter termed "decision region specifying data") is vertex data for the one or for the plurality of rectangular parallelepipeds which form the decision region (hereinafter termed "vertex data"), data which shows the object number of the subject of decision obstacle, and attribute data.

This vertex data is stored as data of the vertex coordinates with respect to the body coordinate system which takes the given point in the subject of decision obstacle as the center. In order to reduce the computation load as will be described hereinafter, the construction is such that this given point coincides with the reference point KP of the displayed object which corresponds to the subject of decision obstacle; in the following, this point will be termed the "decision region reference point". The object number which corresponds to this subject of decision obstacle is the object number of the displayed object which corresponds to the subject of decision obstacle which is stored in the space information storage section 120, and each rectangular parallelepiped includes this information individually.

Further, the attribute data is data which determines whether each rectangular parallelepiped is a positive hit box or a negative hit box, and each rectangular parallelepiped has one item of such data. A positive hit box is a rectangular parallelepiped which is defined for making a decision that a collision has occurred when the point for which a decision is to be made whether or not a collision has occurred is positioned within the internal space (including the surface) of the rectangular parallelepiped. While a negative hit box is a rectangular parallelepiped which is defined for voiding collision decision when the point for which a decision is to be made whether or not a collision has occurred is positioned within the internal space (including the surface) of the rectangular parallelepiped. The collision decision section 118 to be described hereinafter performs collision decision for points which are positioned within the rectangular parallelepiped, based on this attribute data.

Figure 7:
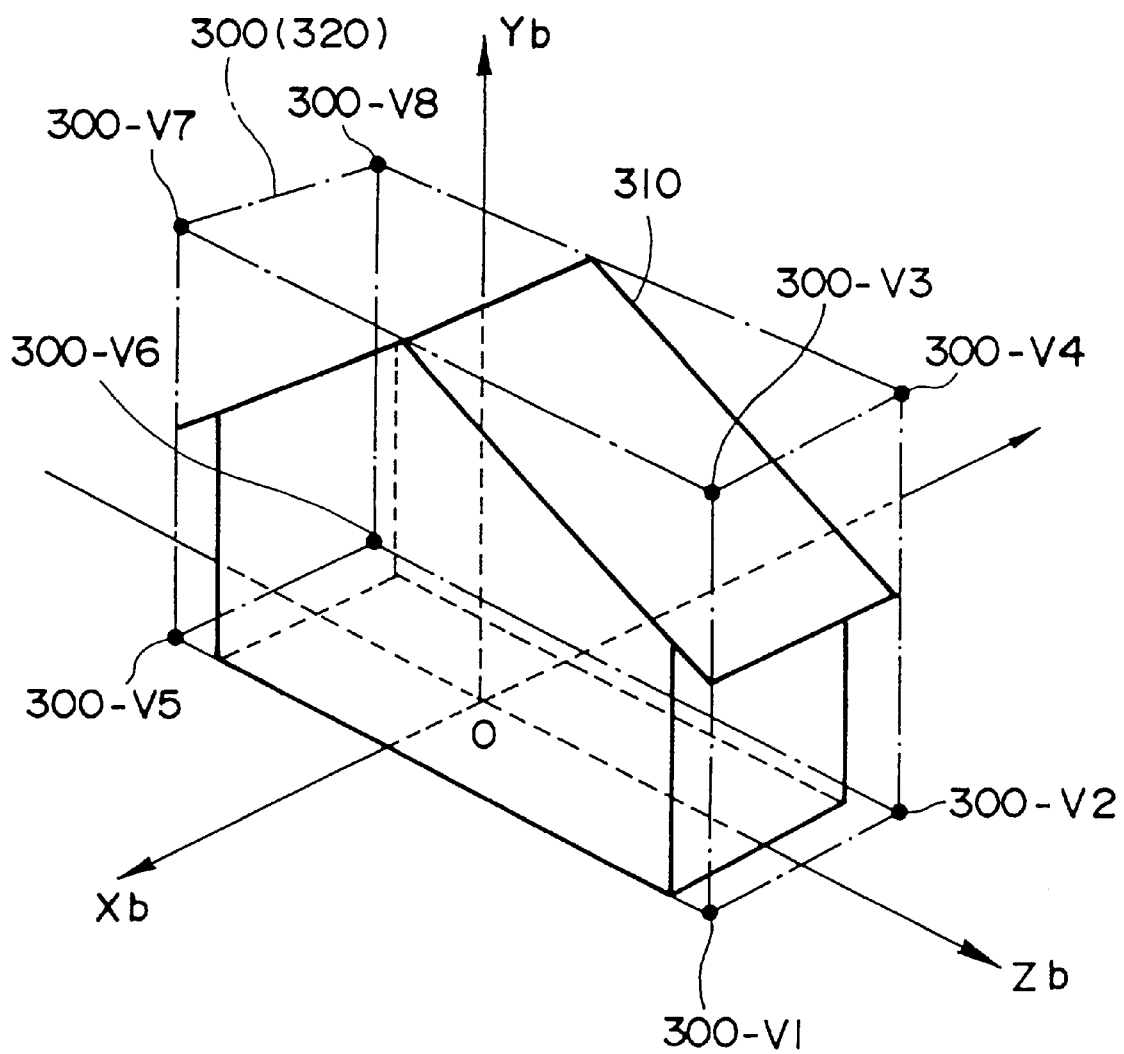
FIG. 7 is a figure showing an exemplary definition of a decision region.

An example of making of a decision region for a subject of decision obstacle will now be explained with reference to FIG. 7. In detail, when the decision region for a house 310 which is the subject of decision obstacle is defined, a decision region 320 for the house 310 is defined by a single rectangular parallelepiped 300 which approximates to the house 310. At this time, the decision region reference point O is the point which coincides with the reference point KP for the displayed object. And the coordinate data for the vertices (300-V1 to 300-V8) of the rectangular parallelepiped 300 in the body coordinate system which takes the decision region basic point O as its origin, is stored in the decision region storage section 116 as vertex data. Further, data for showing that this rectangular parallelepiped 300 is a positive hit box is stored as attribute data, and data showing the object number which corresponds to the house 310 stored in the space information storage section 120 is stored as data showing the object number.

It should be noted that, when defining this decision region, and if a position is taken as the basic state (the state like that shown in FIG. 7) in which three sides which are not mutually parallel of the rectangular parallelepiped which form the decision region are respectively parallel to any of the coordinate axes of the body coordinate system, then the decision region is defined as a rectangular parallelepiped, or a combination thereof, in this basic state or in a state rotated with respect to the basic state around one coordinate axis of the body coordinate system. By defining the decision region in this manner, the amount of coordinate transformation computation which accompanies rotations, and computation load for performing decisions are reduced.

The decision region defining section 114 selects those which are present within a given range around the human-powered aircraft 210 from the subject of decision obstacles, based on the position information for the human-powered aircraft 210 which has been computed by the position computation section 112. It should be noted that the reason of being within the given range is to ensure that no subject of decision obstacles are missed out, since the selection of obstacles is performed using their central points.

This selection is performed as follows. First, the decision region defining section 114 inspects the subject of decision flag in the space information storage section 120 and decides whether or not the displayed object is a subject of decision obstacle. If the displayed object is a subject of decision obstacle, then the decision region defining section 114 decides whether or not the displayed object is within the given range, based on the position information for the displayed object. And if it is within the given range, as a decision region defining subject, the decision region defining section 114 stores the object number of this displayed object which has become a decision region defining subject and position information for it, and also directional information in a temporary storage area which is not shown in the figures, when it is required.

Decision region specifying data is read out from the decision region storage section 116 based on this object number. Further, the vertex data stored as position coordinates with respect to the body coordinate system having D the respective decision region basic point O as its origin is transformed into position coordinates in the world coordinate system, based on the position information corresponding to this object number which has been stored in the temporary storage area not shown in the figures.

At this time the decision region basic point O is set at the same position as the basic point for the displayed object. Therefore, it is possible to transform the vertex data into position coordinates with respect to the world coordinate system by performing mutual addition or subtraction of the vertex data and the position information for the object (that position information which has been stored in the temporary storage area not shown in the figures) which is the coordinates of the basic point of the displayed object.

It should be noted that, if each of directional information are not zero, then it will be necessary to perform further coordinate transformation based on this directional information.

The decision region defining section 114 performs this processing each time that a given time period elapses (normally each $\frac{1}{60}$ of a second), and defines the subject data for collision decision and then transfers this data to the collision decision section 118. This subject data for collision decision is structured so as to include vertex coordinates with respect to the world coordinate system for one or a plurality of rectangular parallelepipeds, and attribute data for the rectangular parallelepipeds.

The collision decision section 118 performs collision decision for the human-powered aircraft 210, based on the subject data for collision decision which has been received from the decision region defining section 114. The decision region defining section 114 is constructed so as to perform collision decision only for given decision points at this time, since performance of collision decision for all of the vertices of the polygons which define the human-powered aircraft 210 would increase the amount of data and the computation load.

FIGS. 17A, 17B, and 17C are polygonal figures defined by given points of the virtual player 220 riding on the human-powered aircraft 210 of this embodiment. FIG. 17A is a frontal view of the virtual player 220 riding on the human-powered aircraft 210, FIG. 170 is a side elevation thereof, and FIG. 17C is a plan view thereof. As shown in FIGS. 17A to 17C, six decision points P1 to P6 are provided on the virtual player 220 riding on the human-powered aircraft 210 of this embodiment. These decision points P1 to P6 are based on the shape of the virtual player 220 riding on the human-powered aircraft 210 and are points set as efficiently as possible so as not to lose realism, and it is deemed that a collision has occurred if any one of these decision points P1 through P6 collides with a decision region.

These given decision points P1 to P6 are provided as position coordinates with respect to the body coordinate system which takes the basic point of the human-powered aircraft 210 as its origin. Accordingly, the collision decision section 118 reads out position information and direction information for the object stored in the space information storage section 120 which corresponds to the human-powered aircraft 210 and transforms these decision points to position coordinates in the world coordinate system.

Collision decision is performed for these decision points P1 to P6 which have been transformed to position coordinates in the world coordinate system based on the above-mentioned subject data for collision decision. As described previously, since the subject data for collision decision comprises vertex coordinates in the world coordinate system of one or of a plurality of rectangular parallelepipeds and attribute data for the rectangular parallelepiped, collision decision between this rectangular parallelepiped and the decision points P1 through P6 should be performed based on the attribute data for the rectangular parallelepiped.

More specifically, for each decision point P1 through P6, first, for the rectangular parallelepipeds of which attribute data indicates that they are positive hit boxes, it is determined whether or not the decision point P1 through P6 is located within the rectangular parallelepipeds (i.e., is located on the surface of the rectangular parallelepiped or within its interior). If for all the positive hit boxes which have been received as subject data for collision decision, there is none within which the decision point P1 through P6 is located, it is deemed that no collision has occurred. On the other hand, if there is one or more such positive hit box within which the decision point is located, then, for each one of those rectangular parallelepipeds whose attribute data indicates that they are negative hit boxes, it is determined whether or not the decision point P1 through P6 is located within the one of the rectangular parallelepipeds (i.e., is located on the surface of the rectangular parallelepiped or within its interior). If there is one or more such negative hit box within which the decision point is located then a decision is taken that no collision has occurred, while if there is no such negative hit box within which the decision point is located then a decision is taken that a collision has occurred. This type of decision is made for each of the decision points P1 through P6, and if any one of these decision points P1 through P6 is deemed that a collision has occurred then a final decision is taken that a collision between the virtual player 220 riding on the human-powered aircraft 210 and an obstacle has occurred.

It should be noted that it is desirable to make the decision regions as described below in order to reduce the computation load on the CPU. In detail, it is desirable to define the rectangular parallelepipeds which form the decision region either to be in the basic state or to be rotated in the body coordinate system about one coordinate axis with respect to the basic state. This is because, by doing this, when the direction information is zero, the decision whether or not the decision point P1 through P6 is located within the rectangular parallelepiped can be performed by addition and subtraction, or by addition and subtraction with one coordinate transformation.

In the following, with this game machine 10, making decision regions as combinations of positive hit boxes and negative hit boxes will be explained.

When the decision region is to be defined by a rectangular parallelepiped or by a combination thereof as an approximation to the shape of the object, it is normally necessary to utilize a plurality of rectangular parallelepipeds in order to perform accurate collision decision. However, it is important to define the decision region by as few rectangular parallelepipeds as possible in order to reduce the amount of data and the computation load, since as described earlier the computations for performing collision decision are performed individually for each rectangular parallelepiped.

When as with this embodiment of the present invention the decision region is defined as a combination of positive hit boxes and negative hit boxes, it often happens that fewer rectangular parallelepipeds are required for making decision region than in the case when the decision region is made only using positive hit boxes.

First, examples of definitions of decision regions as overlapped combinations of positive hit boxes and negative hit boxes will be explained.

Figure 8C:
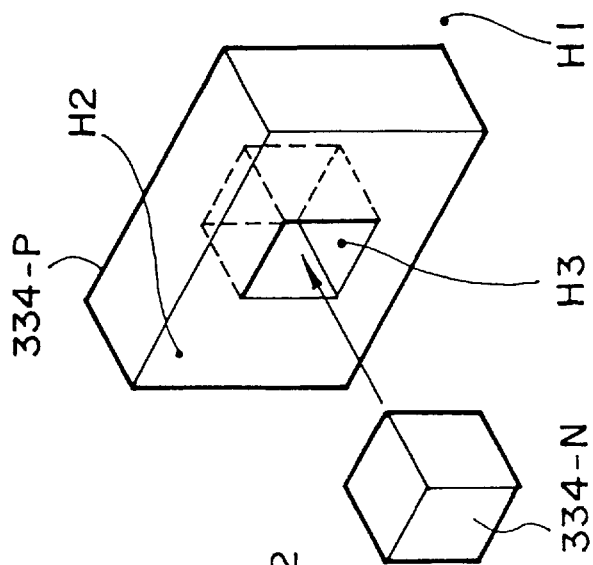
FIGS. 8A, 8B, and 8C are figures showing another exemplary definition of a decision region.
Figure 8B:
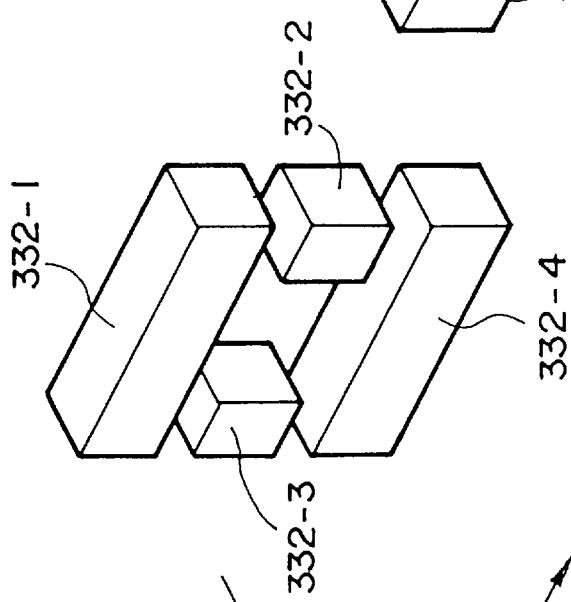
Figure 8A:
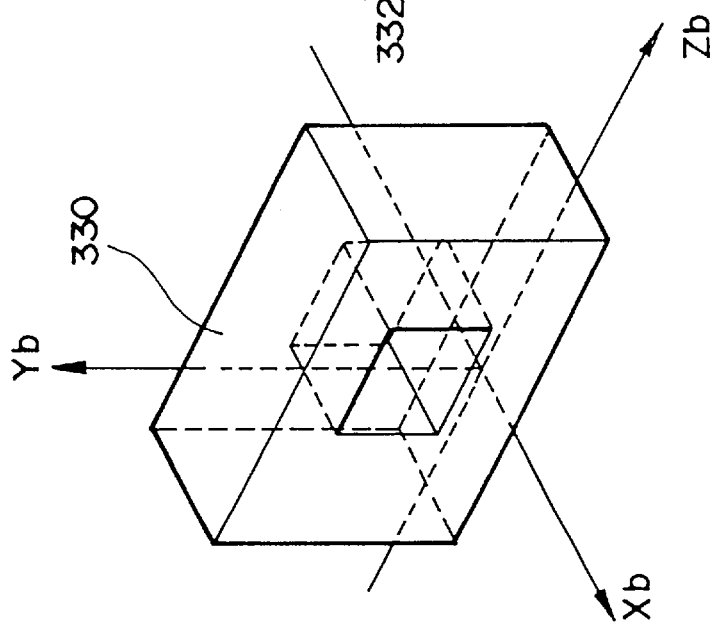

FIGS. 8A through 8C are figures showing an example to make a decision region. FIG. 8A shows the shape of a decision region 330 which approximates to the shape of an object before it has been dissected into rectangular parallelepipeds. If this decision region 330 is formed only of positive hit boxes, as shown in FIG. 8B it is necessary to make the decision region 330 as a combination of a total of four rectangular parallelepipeds 332-1 through 332-4, although it is a simple shape. By contrast to this, when forming decision regions by overlapping positive hit boxes and negative hit boxes, as shown in FIG. 8C it is possible to define the decision region 330 as the combination of a total of two rectangular parallelepipeds: the rectangular parallelepiped 334-$p$ which is a positive hit box, and the rectangular parallelepiped 334-$n$ which is a negative hit box.

In this case, first a decision is made as to whether the decision point is located within the rectangular parallelepiped 334-$p$ which is the positive hit box. And if it is not thus located within the rectangular parallelepiped 334-$p$ then it is deemed that no collision has occurred. On the other hand, if the decision point does lie within the rectangular parallelepiped 334-$p$, then, since there is the possibility of a collision, a decision is made as to whether the decision point is also located within the rectangular parallelepiped 334-$n$ which is the negative hit box. And if it is thus located within the rectangular parallelepiped 334-$n$ then it is deemed that no collision has occurred, while if the decision point is not located within the rectangular parallelepiped 334-$n$ then it is deemed that a collision has occurred. In other words, for hit boxes of different types which overlap, the decision due to the negative hit box takes priority, and it is deemed that no collision has occurred.

For example, in FIG. 8C, since the point H1 is not located in the rectangular parallelepiped 334-*p* which is the positive hit box, therefore it is deemed that no collision has occurred. Further, since the point H2 is located in the rectangular parallelepiped 334-*p* which is the positive hit box and also is not located in the rectangular parallelepiped 334-*n* which is the negative hit box, therefore it is deemed that a collision has occurred. On the other hand, since the point H3 is located both in the rectangular parallelepiped 334-*p* which is the positive hit box and also in the rectangular parallelepiped 334-*n* which is the negative hit box, therefore it is deemed that no collision has occurred.

Figure 9A:
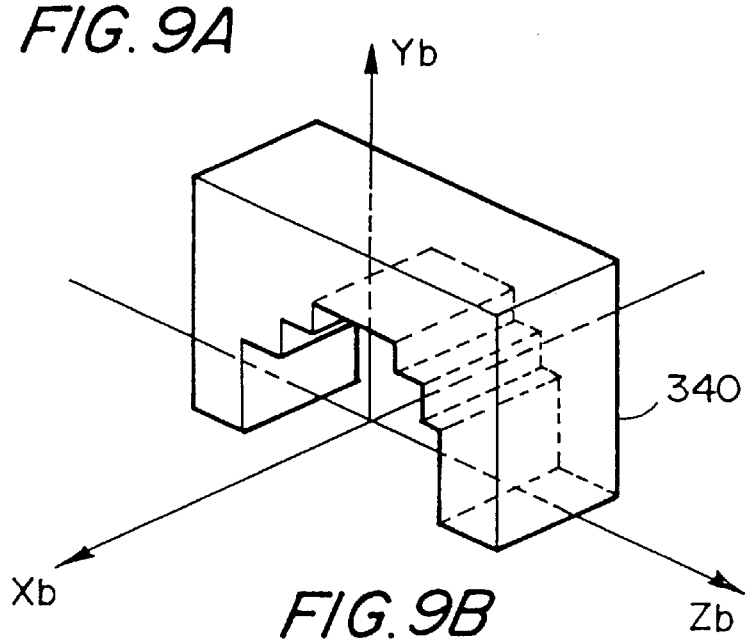
FIGS. 9A, 9B, and 9C are figures showing another exemplary definition of a decision region.
Figure 9B:
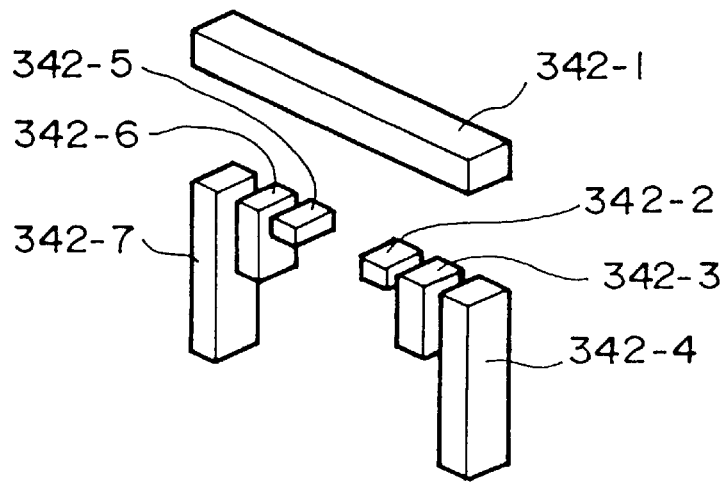
Figure 9C:
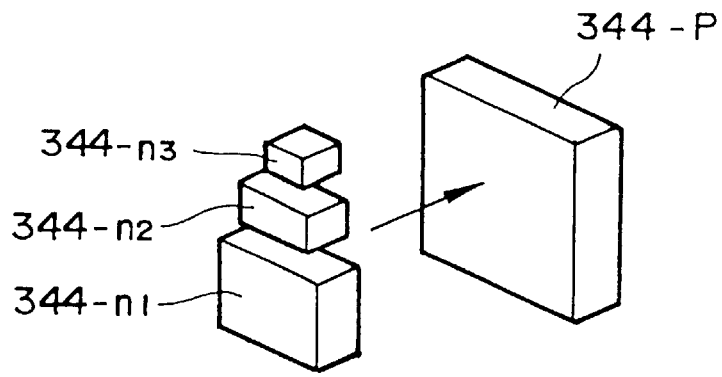

FIGS. 9A, 9B, and 9C are figures showing another example to make a decision region which has a somewhat complicated shape like that of a tunnel. FIG. 9A shows the shape of a decision region 340 which approximates to the shape of an object before it has been dissected into rectangular parallelepipeds. If this decision region 340 is to be defined only with positive hit boxes, then as shown in FIG. 9B it is necessary to make the decision region 340 as a combination of a total of seven rectangular parallelepipeds 342-1 through 342-7, since it is a somewhat complicated shape. By contrast to this, when the decision region 340 is to be defined by overlapping positive hit boxes and negative hit boxes, then as shown in FIG. 9C it is possible to define the decision region 340 as the combination of a total of four rectangular parallelepipeds: the rectangular parallelepiped 344-*p* which is a positive hit box, and the three rectangular parallelepipeds 344-*n*1 through 344-*n*3 which are negative hit boxes.

Next, examples will be explained in which not only rectangular parallelepipeds whose attributes are different, such as positive hit boxes and negative hit boxes, are overlapped, but in which cases are also included in which rectangular parallelepipeds which have the same attribute are overlapped, whereby it is possible to reduce the number of rectangular parallelepipeds which make up the decision region.

Figure 10A:
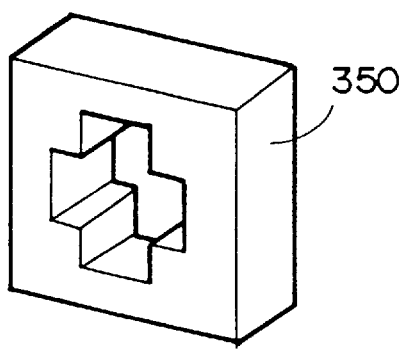
FIGS. 10A, 10B, 10C, and 10D are figures showing another exemplary definition of a decision region.
Figure 10B:
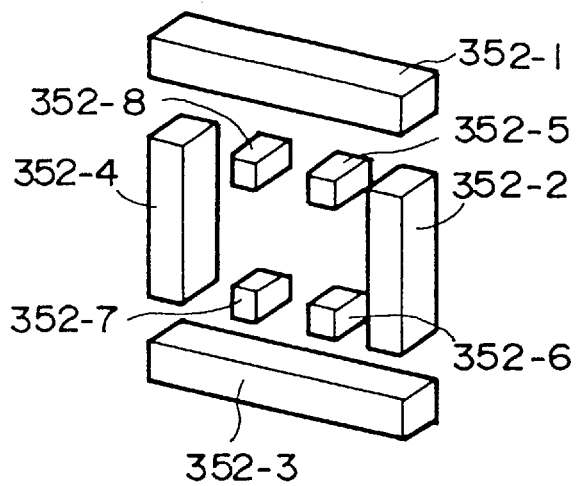
Figure 10C:
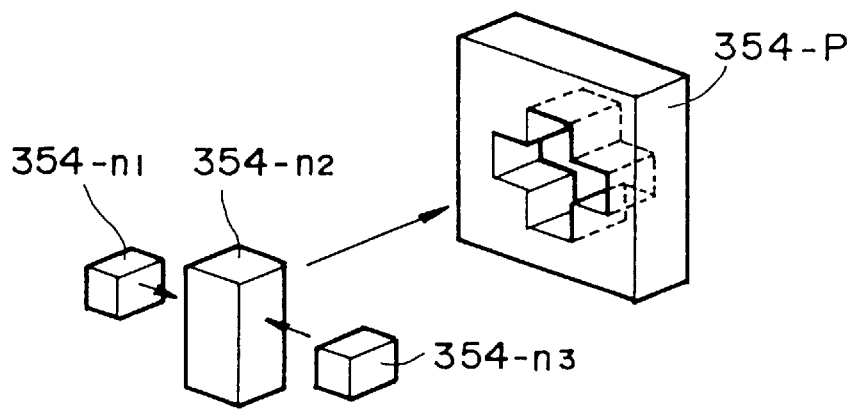
Figure 10D:
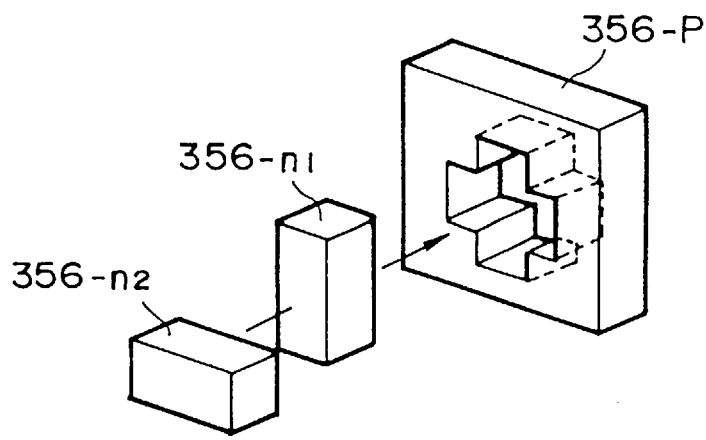

FIGS. 10A through 10D are figures showing another example to make a decision region. FIG. 10A shows the shape of a decision region 350 which approximates to the shape of an object before it has been dissected into rectangular parallelepipeds. And FIGS. 10B through 10D show alternative examples of combination of rectangular parallelepipeds in order to make up this decision region 350. FIG. 10B shows the case when this decision region 350 is to be defined only with positive hit boxes, and as shown in this figure it is necessary to define the decision region 350 as a combination of a total of eight rectangular parallelepipeds 352-1 through 352-8. By contrast to this, when the decision region 350 is to be defined by overlapping positive hit boxes and negative hit boxes, then as shown in FIG. 10C it is possible to define the decision region 350 as the combination of a total of four rectangular parallelepipeds: the rectangular parallelepiped 354-*p* which is a positive hit box, and the three rectangular parallelepipeds 354-*n*1 through 354-*n*3 which are negative hit boxes.

However, even further, as shown in FIG. 10D, it is possible to make the decision region 350 as the combination of a total of three rectangular parallelepipeds, by mutually overlapping the two rectangular parallelepipeds 356-*n*1 and 356-*n*2 which are negative hit boxes.

Performing collision decision by defining the decision regions with combinations of this kind of rectangular parallelepipeds is particularly effective for artificial structures such as buildings which are defined by straight lines, but examples will now also be explained of effective operation for collision decision with respect to natural formations.

Figure 11B:
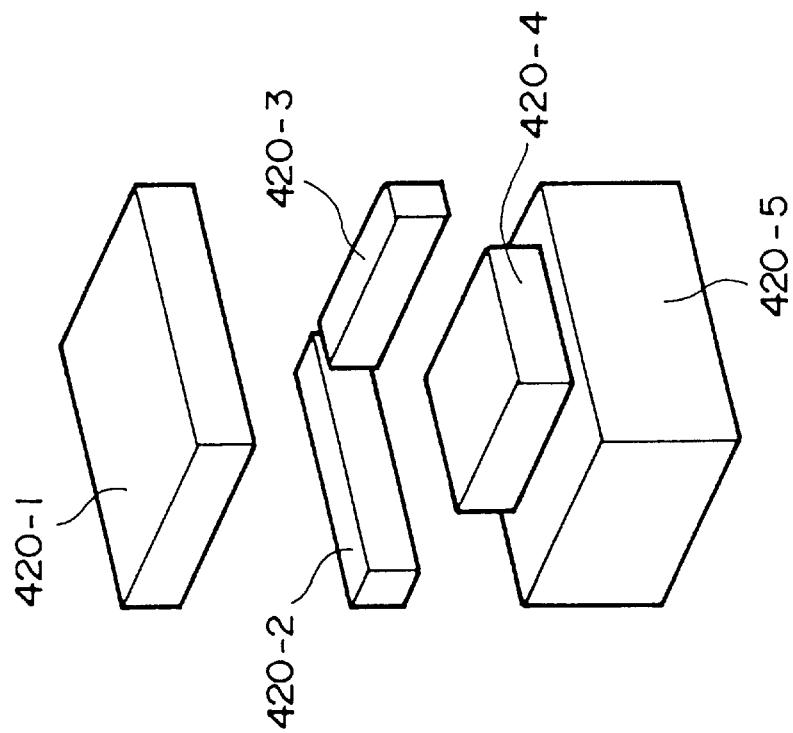
FIGS. 11A and 11B are figures showing another exemplary definition of a decision region.
Figure 11A:
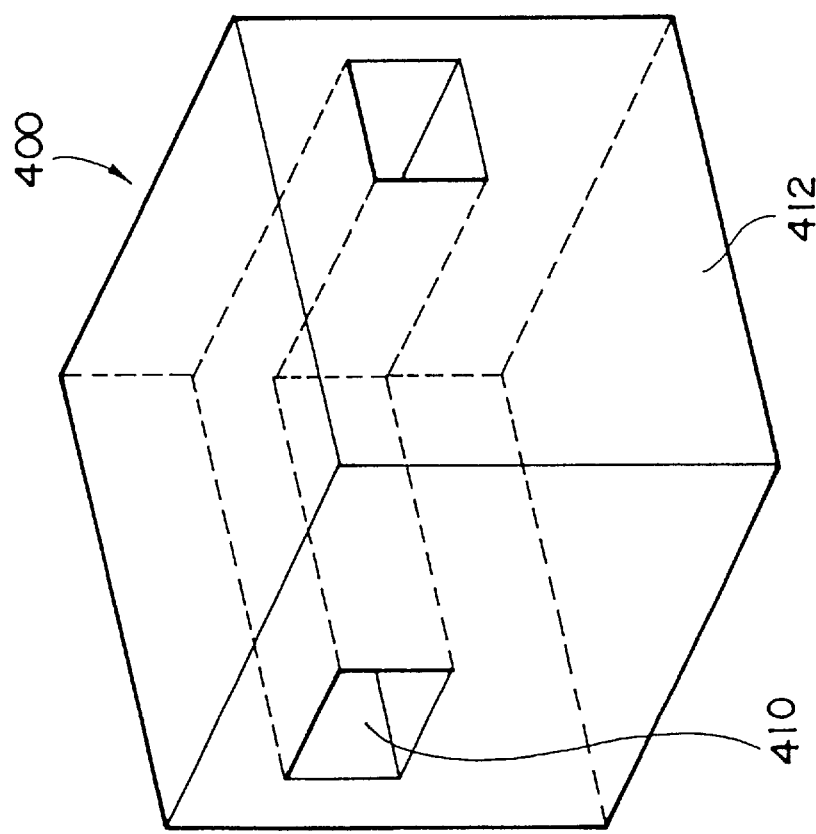
Figure 12:
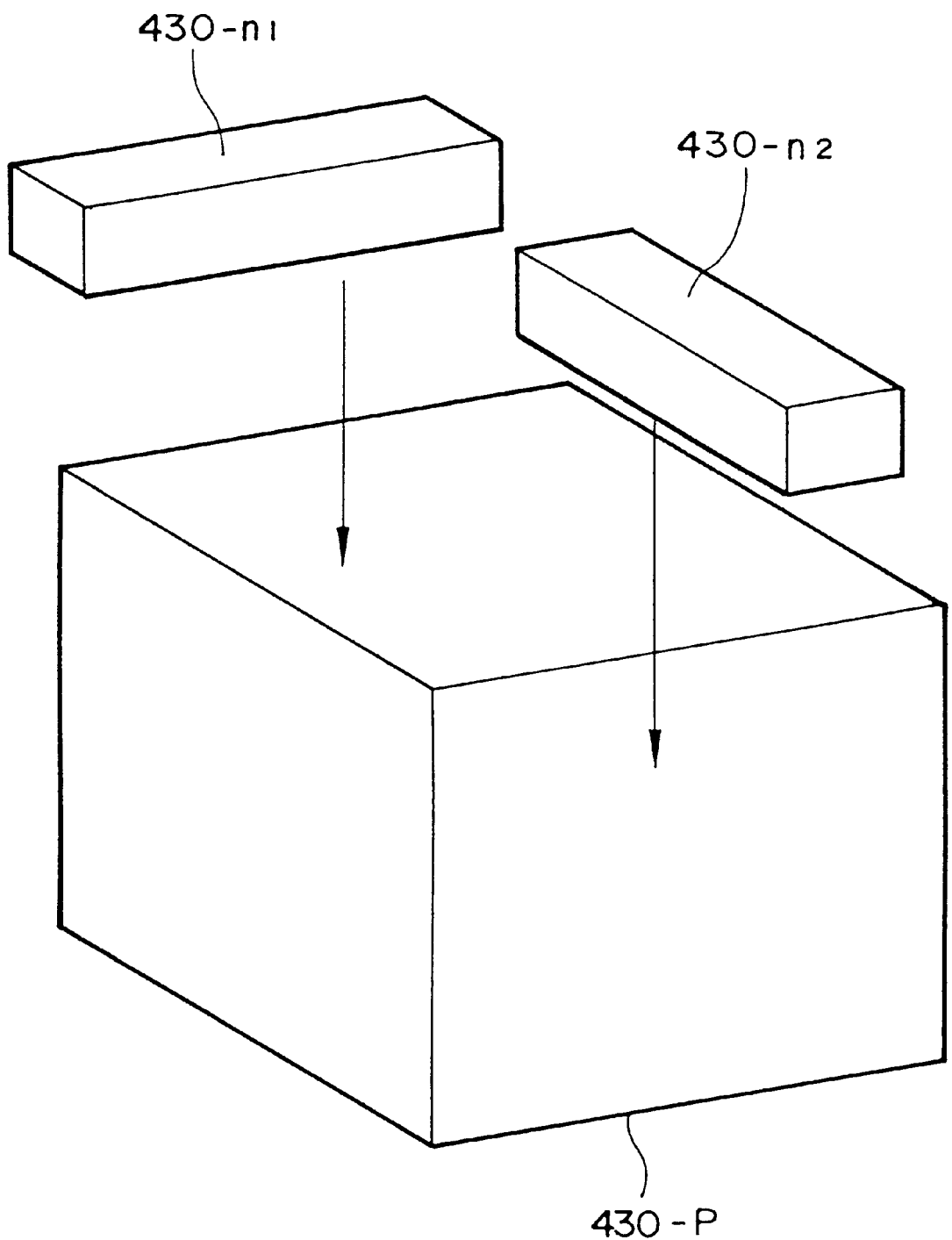
FIG. 12 is a figure showing another exemplary definition of a decision region.

FIGS. 11A and 11B and FIG. 12 are figures showing another example to make a decision region for collision decision for the inner wall of a cave. FIG. 11A is a figure showing a decision region 400 for a natural formation 412 which is a surrounding wall of the cave that is a part of a natural formation forms the cave, and an inner space 410 of the cave. When this type of natural formation is to be defined, it will be beneficial to define the decision region 400 by breaking it up into appropriate portions as shown in the same figure.

If this decision region 400 is to be defined only by positive hit boxes, then it is necessary to define the decision region 400 as a combination of a total of five rectangular parallelepipeds 420-1 through 420-5, as shown in FIG. 11B. In contrast to this, when this decision region 400 is to be defined as a combination of positive hit boxes and negative hit boxes which are mutually overlapped, then as shown in FIG. 12 it is possible to define the decision region 400 as a combination of a total of three rectangular parallelepipeds: a rectangular parallelepiped 430-*p* which is a positive hit box, and two rectangular parallelepipeds 430-*n*1 and 430-*n*2 which are negative hit boxes.

Next, a case will be described in which making a decision region as a combination only of positive hit boxes is difficult.

FIGS. 13A and 13B are figures showing yet another example of making a decision region. FIG. 13A shows the shape of a decision region 440 which approximates to an object before it has been dissected into rectangular parallelepipeds. Although this decision region 440 has a simple shape, it is very difficult to define it as a combination of positive hit boxes. However, as shown in FIG. 13B, it is possible to define the decision region 440 as a combination of a total of two rectangular parallelepipeds: a rectangular parallelepiped 442-*p* which is a positive hit box, and a rectangular parallelepiped 442-*n* which is a negative hit box and which has been rotated.

In this case, it is deemed that no collision has occurred if the decision point is located within the rectangular parallelepiped 442-*n* which is a negative hit box.

It should be noted that if the decision point is located within the rectangular parallelepiped 442-*p* which is a positive hit box then a decision is performed as to whether or not it is located within the rectangular parallelepiped 442-*n* which is a negative hit box. But in this case it is sufficient if the three cornered right prism 444 shown in FIG. 13B (the mutually overlapping portions of the rectangular parallelepiped 442-*p* which is a positive hit box and of the rectangular parallelepiped 442-*n* which is a negative hit box) is utilized as the region with respect to which a decision must be taken. However, it is more desirable to define the decision region 440 using the rectangular parallelepiped 442-*n*, rather than using the prism 444, since as described above a rectangular parallelepiped is most suitable for performing decision computations with a small amount of computation.

FIGS. 14A, 14B and 14C are figures showing yet another example to make a decision region of such a case, which represents a tunnel. FIG. 14A shows the shape of a decision region 450 which approximates to this tunnel before it has been dissected into rectangular parallelepipeds, while FIG. 14B is a plan view of this decision region 450. Although this decision region 450 has a simple shape, it is very difficult to define it as a combination of positive hit boxes. However, as shown in FIG. 14B, it is possible to define the decision region 450 as a combination of a total of two rectangular parallelepipeds: a rectangular parallelepiped 454-*p* which is a positive hit box, and a rectangular parallelepiped 454-*n* which is a negative hit box.

Further, in the above it has been shown that according to the present invention, as compared to the case in which the decision region was defined using only positive hit boxes, it is possible effectively to reduce the number of rectangular parallelepipeds used for making up the decision region by defining that decision region as a combination of overlapped positive hit boxes and negative hit boxes. However, according to circumstances, it can also be effective to define the decision region as one or a combination of negative hit boxes, only. For example, there are cases such as when it is already clear from the situation of the game that the human-powered aircraft 210 has entered into and is flying in a tunnel, in which case it is sufficient to define only a negative hit box which represents the space within the tunnel, and it is deemed that no collision has occurred if the decision point is located within this negative hit box.

Further, although the case according to the present invention has been explained in which, for the overlapping portion of a positive hit box and a negative hit box, the result of the decision for the negative hit box is effective, it is also possible to provide different decision rules for dealing with this overlapping portion of the positive hit box and the negative hit box.

Figure 15:
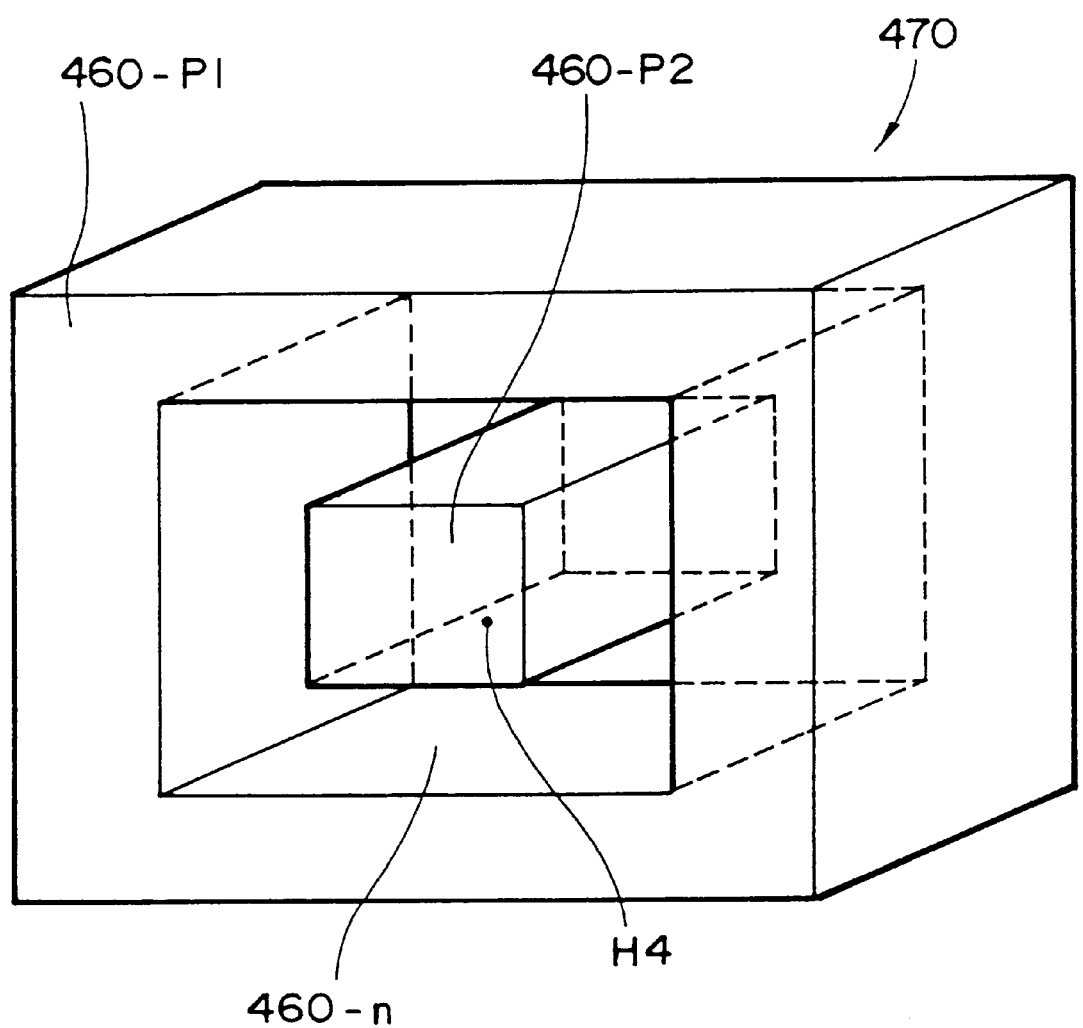
FIG. 15 is a figure showing still yet another exemplary definition of a decision region.

FIG. 15 is a figure showing still yet another exemplary definition of a decision region, for which such different decision rules should be applied. For this decision region 470, a rectangular parallelepiped 460-*n* which is a negative hit box is provided in the interior of a rectangular parallelepiped 460-*p1* which is a positive hit box, and further another rectangular parallelepiped 460-*p2* which is a positive hit box is provided in the interior of this rectangular parallelepiped 460-*n*. In such a case, although the point H4 actually is undergoing collision, this will not be the result of a decision which is taken according to the above described decision rules in which the decision for the negative hit box 460-*n* takes priority. This case still falls within the technical scope of the present invention, although it is necessary to provide different decision rules whose actual terms are different.

Further, with this embodiment, although the above explanation has been in terms of cases in which the decision regions have been defined in the form of rectangular parallelepipeds or as combinations thereof, it would also be possible to define them in the form of other types of solid form which can be specified with a relatively small amount of data, such as spheres or right cylinders. In such cases it is desirable to define the decision regions by solid forms for which the computation loads for performing the decisions is as small as possible.

Further, although the above embodiment of the present invention has been described in case that the decision regions are defined in advance and are stored in the decision region storage section, it would also be possible, as an alternative,. for them to be defined in real time.

Further, although the above embodiment of the present invention has been explained in case that the decisions are performed with the use of position coordinates which have been transformed into the world coordinate system, it would also be possible, as an alternative, for them to be transformed into position coordinates in a body coordinate system for each body. Moreover it should also be acceptable, if it is for fixed bodies, to define the establishment of the decision regions in terms of position coordinates in the world coordinate system.

Figure 16:
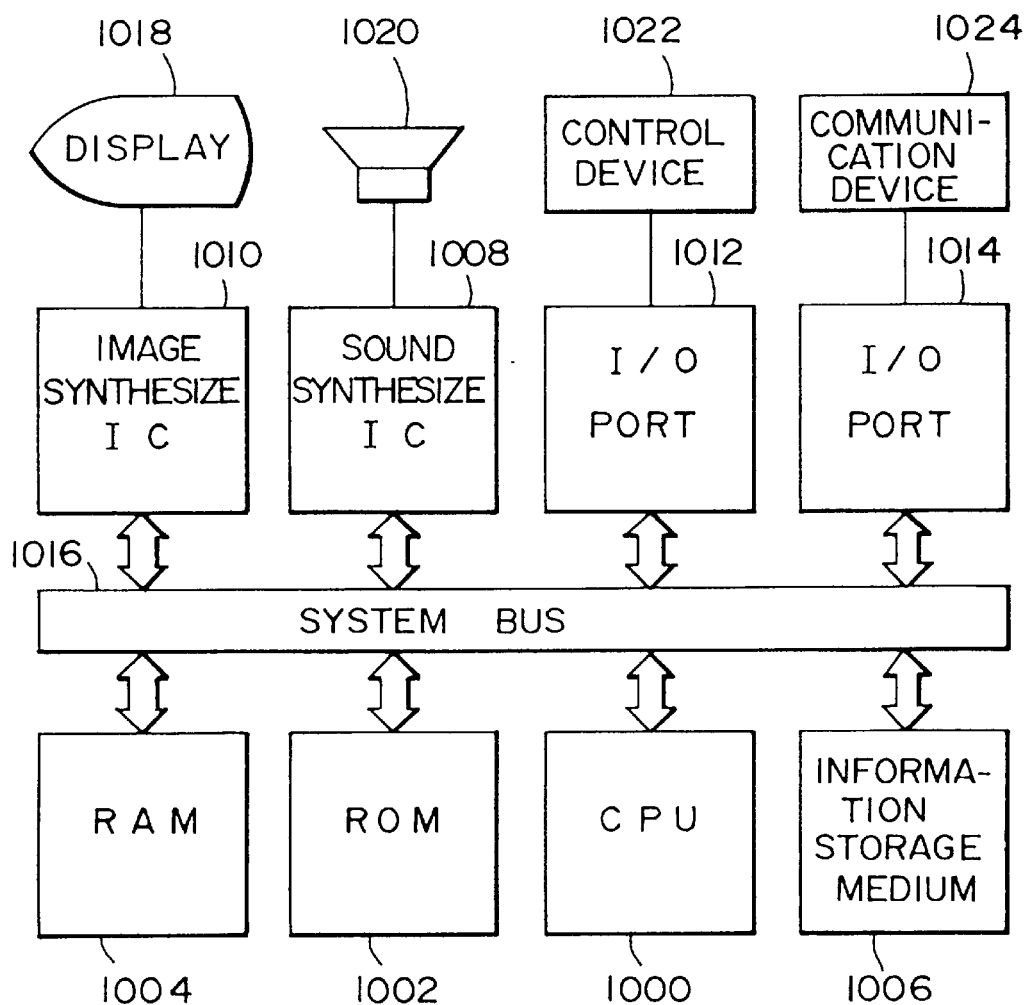
FIG. 16 is a figure showing an exemplary hardware construction for the game machine.

Further, the present invention as explained above can equally be realized using either home or arcade hardware. FIG. 16 is a figure showing an exemplary hardware construction for the game machine of a type which is widely used. In the game machine shown in this figure, a CPU 1000, a ROM 1002, a RAM 1004, an information storage medium 1006, a sound synthesize IC 1008, an image synthesize IC 1010, and I/O ports 1012 and 1014 are connected together via a system bus 1016 so as to be capable of mutual data transmission and receiving. A display 1018 is connected to this image synthesize IC 1010, while a speaker 1020 is connected to the sound synthesize IC 1008, a control device 1022 is connected to the I/O port 1012, and a communication device 1024 is connected to the I/O port 1014.

By the information storage medium 1006 is meant a storage means such as a CD-ROM, a game ROM, a memory card which is provided so as to be optionally attached to, or removed from, the main body of the game machine, and a type may also be utilized which can overwrite and save given information according to the content of the game. Further, the ROM 1002 is a storage means which is fixedly provided to the main body of the game machine. This device is a means for storing information which has no particular relationship with any individual game title, such as initialization information for the main body of the game machine, rather than information which has a relationship with a particular game title, such as the game program and space information for the game stages.

The control device 1022 is a device for the player to input the results of decisions which he takes during the progress of the game to the main body of the game machine, and it is possible to employ a pad type input device which is widely utilized in home systems, or a steering wheel or an accelerator pedal which is used in arcade driving games, or the like.

The CPU 1000 controls the game machine as a whole as we as executing various data processing, according to the game program and the system program which are stored in the information storage medium 1006 and the ROM 1002, and according to the signal input by the control device 1022. The RAM 1004 is a storage means which is utilized as a working region for this CPU 1000, and stores given contents from the information storage medium 1006 and the RAM 1002, as well as the results of computations performed by the CPU 1000 and the like.

Further, the sound synthesize IC 1008 and the image synthesize IC 1010 are provided to this type of game machine, so that it can perform output of sound and images as desired. The sound synthesize IC 1008 is a circuit which synthesize effect sounds and game music and the like based on information which is stored in the information storage medium 1006 and the ROM 1002, and this game music and so on which has been thus synthesized is output via the speaker 1020. Further, the image synthesize IC 1010 is a circuit which creates pixel information to be output on the display 1018, based on image information which is dispatched from the RAM 104, the ROM 1002, the information storage medium 1006, and so on.

Yet further, the communication device 1024 is a unit which interchanges various information which is available in the interior of the game machine to and from the exterior. And it can be used for connection to another game machine so as to transmit and receive given information according to a game program, or to transmit or receive information such as a game program via a transmission circuit.

The present invention can also easily be realized using a common type of game machine as described above. For example, the operation section 20 corresponds to the control device 1022, while the space computation section 110 is realized by the CPU 1000 and by software which is stored in the ROM 1002 and the information storage medium 1006. Further, the space information storage section 120 and the object information storage section 140 may be provided in any of the RAM 1004, the ROM 1002, or the information storage medium 1006. Yet further, the image synthesizer section 130 may be realized by the image synthesize IC 1010, or by the CPU 1000 and by given software. Further, the display section 80 corresponds to the display 1018.

What is claimed is:

1. A simulation apparatus which performs collision computations for a moving object which moves in a virtual three-dimensional space with respect to a target object which is present in said virtual three-dimensional space and is a subject of collision, said simulation apparatus comprising:

decision region defining means for defining a decision region which specifies a three-dimensional space for collision decision based on at least the entire shape of said target object and a portion thereof; and collision decision means for deciding whether a collision has occurred or not, based on whether or not the position of said moving object is located within said decision region;

wherein said decision region defining means defines a three dimensional negative hit region, a portion of which overlaps the positive hit region which specifies a noncollision region for said decision region; and said collision decision means decides that no collision has occurred when the position of said moving object is located within said noncollision region for said decision region.

2. The simulation apparatus according to claim 1, wherein said decision region defining means defines said decision region as a combination of solid forms.

3. The simulation apparatus according to claim 1, wherein said decision region defining means defines said decision region as one rectangular parallelepiped or as a combination of rectangular parallelepipeds.

4. The simulation apparatus according to claim 3, wherein said decision region defining means defines said decision region by setting a basic state that is a position in which three sides of a rectangular parallelepiped forming said decision region, which are not mutually parallel each other, respectively parallel to any one of coordinate axes in the world coordinate system of the virtual three-dimensional space, or by rotating said rectangular parallelepiped from said basic state around one or two of the coordinate axes of the world coordinate system.

5. The simulation apparatus according to claim 3, wherein said decision region defining means defines said decision region by setting a basic state that is a position in which three sides of a rectangular parallelepiped forming said decision region, which are not mutually parallel each other, respectively parallel to any one of coordinate axes in a body coordinate system of said target object in the virtual three-dimensional space, or by rotating said rectangular parallelepiped from said basic state around one or two of the coordinate axes of said body coordinate system.

6. The simulation apparatus according to claim 3, wherein said decision region defining means defines said decision region by combining rectangular parallelepipeds, so that, by any way of combination, one of three sides of one rectangular parallelepipeds which are not parallel to each other is not parallel to any one of three side of another rectangular parallelepipeds which are not parallel to each other.

7. The simulation apparatus according to claim 1, further comprising:

an input means for inputting at least one of a movement position of said moving object which is used for deciding whether a collision has occurred or not by said collision decision means, and movement conditions for determining said movement position; and an image synthesizing means for synthesizing a simulation image for said virtual three-dimensional space to be displayed on a display section based on the results of decision by said collision decision means.

8. A simulation apparatus which performs collision computations for a moving object which moves in a virtual three-dimensional space with respect to a target object which is present in said virtual three-dimensional space and is subject of collision, said simulation apparatus comprising:

decision region defining means for defining a decision region which specifies a three-dimensional space for collision decision based on at least the entire shape of said target object and a portion thereof; and collision decision means for deciding whether a collision has occurred or not, based on whether or not the position of said moving object is located within said decision region, wherein said decision region defining means defines, as said decision region, a combination of a negative hit region which specifies a noncollision region and a positive hit region which specifies a collision region, said hit regions at least partly overlapping one another; and wherein said collision decision means decides that no collision has occurred when the position of said moving object is located only within said negative hit region, decides that a collision has occurred when the position of said moving object is located only within said positive hit region, and decides whether a collision has occurred or not based on given rules when the position of said moving object is located within the region of overlap between said negative hit region and said positive hit region.

9. The simulation apparatus according to claim 8, wherein said decision region defining means defines said decision region as a combination of solid forms.

10. The simulation apparatus according to claim 9, wherein said decision region defining means defines said decision region by combining solid forms which form the same type of hit region, that is at least one of a negative hit region and a positive hit region, so that at least one portion thereof overlaps.

11. The simulation apparatus according to claim 8, wherein said decision region defining means defines said decision region as one rectangular parallelepiped or as a combination of rectangular parallelepipeds.

12. The simulation apparatus according to claim 11, wherein said decision region defining means defines said decision region by setting a basic state that is a position in which three sides of a rectangular parallelepiped forming said decision region, which are not mutually parallel each other, respectively parallel to any one of coordinate axes in the world coordinate system of the virtual three-dimensional space, or by rotating said rectangular parallelepiped from said basic state around one or two of the coordinate axes of the world coordinate system.

13. The simulation apparatus according to claim 11, wherein said decision region defining means defines said decision region by setting a basic state that is a position in which three sides of a rectangular parallelepiped forming said decision region, which are not mutually parallel each other, respectively parallel to any one of coordinate axes in a body coordinate system of said target object in the virtual three-dimensional space, or by rotating said rectangular parallelepiped from said basic state around one or two of the coordinate axes of said body coordinate system.

14. The simulation apparatus according to claim 11, wherein said decision region defining means defines said decision region by combining rectangular parallelepipeds, so that, by any way of combination, one of three sides of one rectangular parallelepipeds which are not parallel to each other is not parallel to any one of three side of another rectangular parallelepipeds which are not parallel to each other.

15. The simulation apparatus according to claim 8, further comprising:
   an input means for inputting at least one of a movement position of said moving object which is used for deciding whether a collision has occurred or not by said collision decision means, and movement conditions for determining said movement position; and
   an image synthesizing means for synthesizing a simulation image for said virtual three-dimensional space to be displayed on a display section based on the results of decision by said collision decision means.

16. An information storage medium which stores information for performing collision computations for a moving object which moves in a virtual three-dimensional space with respect to a three dimensional target object which is present in said virtual three-dimensional space and can be collided with the information storage medium comprising:
   information for performing a process for defining a decision region which specifies a three-dimensional space for the collision decision based on at least the entire shape of the three dimensional target object and of a portion thereof; and
   information for performing a process for deciding whether a collision has occurred, based on whether the position of the moving object is located within the decision region;
   wherein the information for performing a process for defining the decision region comprises information for performing a process for defining a negative hit region, a portion of which overlaps the positive hit region, which specifies a noncollision region for the decision region; and
   the information for performing a process for deciding whether a collision has occurred comprises information for performing a process for deciding that no collision has occurred when the position of said moving object is located within said noncollision region for said decision region.

17. The information storage medium according to claim 16, wherein the decision region is a combination of solid forms.

18. The information storage medium according to claim 16, wherein the decision region is one rectangular parallelepiped or is a combination of rectangular parallelepipeds.

19. The information storage medium according to claim 18, wherein the decision region is a basic form that is positioned such that three sides of a rectangular parallelepiped forming the decision region, which are not mutually parallel each other, are respectively parallel to any one of coordinate axes in the world coordinate system of the virtual three-dimensional space, or by rotating the rectangular parallelepiped from the basic state around one or two of the coordinate axes of the world coordinate system.

20. The information storage medium according to claim 19, wherein the decision region is a basic form that is positioned such that three sides of a rectangular parallelepiped forming the decision region, which are not mutually parallel each other, are respectively parallel to any one of coordinate axes in the world coordinate system of the virtual three-dimensional space, or by rotating the rectangular parallelepiped from the basic state around one or two of the coordinate axes of the world coordinate system.

21. The information storage medium of claim 16, further comprising:
   an input means for inputting at least one of a movement position of the moving object which is used for deciding whether a collision has occurred by the process for whether a collision has occurred, and movement conditions for determining the movement position; and
   an image synthesizing means for synthesizing a simulation image for the virtual three-dimensional space to be displayed on a display section based on the results of decision by the collision detection means.

22. An information storage medium which stores information for performing collision computations for a moving object which moves in a virtual three-dimensional space with respect to a target object which is present in said virtual three-dimensional space and is a subject of collision, said information storage medium comprising:
   information for performing a process for defining a decision region which specifies a three-dimensional space for the collision decision based on at least the entire shape of said target object and of a portion thereof; and
   information for performing a process for deciding whether a collision has occurred, based on whether the position of the moving object is located within the decision region;
   wherein said information for performing a process for defining said decision region includes information for performing a process for defining, as said decision region, a combination of a negative hit region which specifies a noncollision region and a positive hit region which specifies a collision region, said hit regions at least partly overlapping one another; and
   wherein said information for performing a process for deciding whether a collision has occurred or not includes information for performing a process of deciding that no collision has occurred when the position of said moving object is located only within said negative hit region, for deciding that a collision has occurred when the position of said moving object is located only within said positive hit region, and for deciding whether a collision has occurred or not based on given rules when the position of said moving object is located within the region of overlap between said negative hit region and said positive hit region.

23. The information storage medium according to claim 22, wherein the decision region is a combination of solid forms.

24. The information storage medium according to claim 22, wherein the decision region is one rectangular parallelepiped or is a combination of rectangular parallelepipeds.

25. The information storage medium according to claim 24, wherein the decision region is a basic form that is positioned such that three sides of a rectangular parallelepiped forming the decision region, which are not mutually parallel each other, are respectively parallel to any one of coordinate axes in the world coordinate system of the virtual three-dimensional space, or by rotating the rectangular parallelepiped from the basic state around one or two of the coordinate axes of the world coordinate system.

26. The information storage medium according to claim 25, wherein the decision region is a basic form that is positioned such that three sides of a rectangular parallelepiped forming the decision region, which are not mutually parallel each other, are respectively parallel to any one of coordinate axes in the world coordinate system of the virtual three-dimensional space, or by rotating the rectangular parallelepiped from the basic state around one or two of the coordinate axes of the world coordinate system.

27. The information storage medium of claim 22, further comprising:

an input means for inputting at least one of a movement position of the moving object which is used for deciding whether a collision has occurred by the process for whether a collision has occurred, and movement conditions for determining the movement position; and an image synthesizing means for synthesizing a simulation image for the virtual three-dimensional space to be displayed on a display section based on the results of decision by the collision detection means.

* * * * *